United States Patent
Takahashi

(10) Patent No.: US 6,191,865 B1
(45) Date of Patent: Feb. 20, 2001

(54) IMAGE PROCESSING SYSTEM AND METHOD FOR CONTROLLING SUCH SYSTEM

(75) Inventor: Masayoshi Takahashi, Numazu (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/030,374

(22) Filed: Feb. 25, 1998

(30) Foreign Application Priority Data

Feb. 26, 1997 (JP) .................................................. 9-042386
Jul. 31, 1997 (JP) .................................................. 9-206648

(51) Int. Cl.[7] .................................................. B41B 15/00
(52) U.S. Cl. .................................................. 358/1.15; 358/448
(58) Field of Search ................................ 358/1.15, 1.16, 358/1.17, 1.13, 1.14, 448, 1.2

(56) References Cited

U.S. PATENT DOCUMENTS 5,327,260 * 7/1994 Shimomae et al. .................. 358/448
5,361,329 * 11/1994 Morita et al. .......................... 358/1.2

* cited by examiner

*Primary Examiner*—Jeffrey Gaffin
*Assistant Examiner*—Thanh Y. Tran
(74) *Attorney, Agent, or Firm*—Fitzpatrick, Cella, Harper & Scinto

(57) ABSTRACT

An image generating system is structured to transfer the N-dot multivalued image data from an image generating device to write them on the N numbers of FIFO memories in synchronism with a specific transfer clocking, and to read them out to the engine by the clock having 1/N transfer frequency. This clock synchronizes with the horizontally synchronous signals. Then, the image data are selected by means of a selector one after another for output. The multivalued image data thus output are converted into the binary image data to be transferred to the engine in synchronism with the transfer frequency. In this way, the system can be formed simpler with ease as desired.

33 Claims, 21 Drawing Sheets

IMAGE PROCESSING SYSTEM AND METHOD FOR CONTROLLING SUCH SYSTEM

BACKGROUND OF THE INVENTION

1. Field of the Invention

The present invention relates to an image processing system for generating images in accordance with image information to generate images based upon the image generating signals. The invention also relates to a method for controlling such system.

2. Related Background Art

In conjunction with FIG. 19 to FIG. 21, the description will be made of one example of the image processing system for generating images in accordance with image information.

FIG. 20 is a view which illustrates an image generating system (hereinafter referred to as an engine) 101 centering on its inner structure. At first, the laser beams that emitted from a semiconductor laser 901 are incident upon a polygon mirror 903 through an fθ lens 902. By means of the polygon mirror 903, the laser beams are caused to scan on a photosensitive drum 905 of through a cylindrical lens 904. Also, the laser beams from the polygon mirror 903 are reflected on a BD mirror 906, and detected as BD signals by means of a BD detection circuit 907. Then, images are written on the photosensitive drum 905 on the basis of the BD signals 104 from the BD detection circuit 907.

In FIG. 19, the BD signals 104 transmitted from the engine 101 are received by the control circuit 802 of an interface unit 801. The control circuit 802 generates the LSYNC signals 106 to be transmitted to the image generating system 803; the resetting signal WRST (write reset) 111 to the FIFO memory 805; the RRST (read rest) 112; and the clock PCLK 113 in synchronism the BD signals 104. Also, this circuit is provided with the PWM IC 110 that performs the PWM conversion of the multivalued image data to make them binary image data in order to provide the gradations for one dot.

The image generating system 803 comprises an image memory 806 and a driver 807. In synchronism with the arbitrary clock (hereinafter referred to as "VCLK") 804, one-line portion of the multivalued image data VIDEOA1 is transferred from the image memory 806 to the driver 807, and in turn, from the driver 807 to the interface unit 801. However, the clock VCLK 804 is assumed to generate a frequency higher than the frequency at which the one line portion of image data is transferred within a period of BD cycle.

Now, the description will be made of the operation to be performed under the system thus arranged. At first, in synchronism with the clock VCLK 804 transmitted by the image generating system 803, one line portion of the multivalued image data VIDEOA1 is written on the FIFO memory 805 in the interface unit 802. The one line portion of the multivalued image data VIDEOA1 is read out in synchronism with the image clock PCLK 113 serving as the image generating signals. Thus, this portion of the data is transferred to the PWM IC 110. This PWM IC 110 binalizes the multivalued image data VIDEOA2 and converts them into the binary image data VDO.

Then, with the image clock PCLK 113 which is also inputted into the PWM IC, the binary image data VDO is transferred to the semiconductor laser 901 in the engine 101 in synchronism with the image clock PCLK 113, thus generating images.

FIG. 21 is a timing chart which shows each of the signals generated in the control circuit 802 of the interface unit 801. The VIDEOA1 and VIDEOA2 are 8-bit multivalued image data. The multivalued image data VIDEOA2 are the data written between the intervals of the last BD signal, and read out between the intervals of the next BD signal. This set up is the same in the description to be made later. Then, at the timing of the LSYNC signal 106, the multivalued image data VIDEOA1 are swept out from the image generating system 803, and the binary image data VDO are transferred to the engine 101 in synchronism of the BD signal 104.

The transfer speed of the one line portion of the image data to be sent out from the image generating system 803 to the FIFO memory 805 in the interface unit 801, namely, the clock VCL, is dependent on the cycle of the BD signal of the engine 101. This transfer speed should be set so as to enable the one line portion of the image data to be transferred within the period of one cycle of the BD signal 104.

However, there is a limit to the transfer speed made available by the clock VCLk even if the provision of a higher speed is attempted for the image clock PCLK 113 of the engine 101. Here, due to this limit, a problem is encountered that system cannot be built as desired.

SUMMARY OF THE INVENTION

The present invention is designed with a view to solving such problem. It is an object of the invention to provide an image processing system for which a desired system can be built easily and simply corresponding to a higher image clock of the image generating unit by arbitrarily setting the transfer speed of image data from the image generating unit to the interface unit.

In order to achieve the object described above, an image generating system of the present invention, which is provided with an interface unit between an image generating device and an image formation device, comprises the image generating device having means for sending out N-dot data in parallel in synchronism with a specific transfer clocking, and this interface unit is formed by conversion means for converting the N-dot parallel data to one-dot serial data, as well as by output means for outputting the serial data thus converted by the conversion means in synchronism with the image clock signal from the image generating device.

Also, in order to achieve the object described above, a method of the present invention for controlling an image generating system, which is provided with an interface unit between an image generating device and an image formation device, comprises the steps of inputting N-dot data in parallel from the image generating device in synchronism with a specific transfer clocking; of converting the N-dot parallel data to one-dot serial data; and of outputting the serial data converted by the conversion means from the image generating device in synchronism with the image clock signal.

Also, an image processing system of the present invention is such that images are generated in an image generating unit in accordance with image information, and that the images thus generated are sent out to an interface unit for generating images by means of an image generating unit in accordance with image generating signals. This system comprises one image memory arranged for the image generating unit for storing one image, which is provided with sending out means for sending out image data of N-dot portions at a time; N numbers of drivers that receive from the image memory the N numbers of image data one after another individually; N numbers of transfer paths that receive the N numbers of image data from the N numbers of drivers each individually; first sending out control means for controlling the sending out of the image from the one image memory to the N numbers of drivers per N-dot portion in parallel at a time in synchronism with a specific transfer clocking; second sending out control means for controlling the sending out of the image data from the N numbers of drivers to the N numbers of transfer paths per N-dot portion in parallel at a time in synchronism with a specific transfer clocking; third sending out control means for controlling the sending out the image data from the N numbers of transfer paths to the interface unit per N-dot portion in parallel at a time in synchronism with a specific transfer clocking; N numbers of memories for storing separately each N-dot image data sent out from the N numbers of transfer paths; selection means for selecting the N dot-data sent out from the N numbers of memories per dot one after another; and fourth sending out control means for controlling the sending out of the one-dot image data thus selected by selection means one after another to the image formation unit in synchronism with the image formation signal.

Here, the one image memory arranged for the image generating unit is provided with (8×N) bits so that the eight-bit data having the depth of 256 gradations for one dot can be sent out per N-dot portion.

The specific transfer clocking of the first to third sending out control means synchronizes with the clock of the image formation signal generated by the fourth sending out control means.

The second and third sending out control means synchronizes with the specific transfer clocking so as to send out the N-dot image data in the main scanning direction per one-line portion in parallel.

Also, an image generating device of the present invention is such that images are generated in an image generating unit in accordance with image information, and that the images thus generated are sent out to an external interface unit for generating images. This system comprises one image memory arranged for the image generating unit for storing one image, which is provided with sending out means for sending out image data of N-dot portions at a time; N numbers of drivers that receive from the image memory the N numbers of image data one after another individually; N numbers of transfer paths that receive N numbers of image data from the N numbers of drivers each individually; first sending out control means for controlling the sending out of the image from the one image memory to the N numbers of drivers per N-dot portion in parallel at a time in synchronism with a specific transfer clocking; second sending out control means for controlling the sending out of the image data from the N numbers of drivers to the N numbers of transfer paths per N-dot portion in parallel at a time in synchronism with a specific transfer clocking; third sending out control means for controlling the sending out the image data from the N numbers of transfer paths to the interface unit per N-dot portion in parallel at a time in synchronism with a specific transfer clocking; N numbers of memories provided for the interface unit for storing separately each N-dot image data sent out from the N numbers of transfer paths; selection means for selecting the N dot-data sent out from the N numbers of memories per dot one after another; and fourth sending out control means for controlling the sending out of the one-dot image data thus selected by selection means one after another to the image formation unit in synchronism with the image formation signal. In this manner, the image generating device is structured.

Here, the one image memory arranged for the image generating unit is provided with (8×N) bits so that the eight-bit data having the depth of 256 gradations for one dot can be sent out per N-dot portion.

The specific transfer clocking of the first to third sending out control means synchronizes with the clock of the image formation signal generated by the external interface unit.

The second and third sending out control means synchronizes with the specific transfer clocking so as to send out the N-dot image data in the main scanning direction per one-line portion in parallel.

Also, in accordance with the present invention, it is a medium for storing a control program prepared to achieve the object thereof, which controls by a computer to send out the image data generated in an image generating unit to an image formation unit through an interface unit. The control program is such that in an image generating unit the computer sends out the image data from one image memory to the N numbers of drivers per N-dot portion in parallel at a time in synchronism with a specific transfer clocking; sends out the image data from the N numbers of drivers to the N numbers of transfer paths per N-dot portion in parallel at a time in synchronism of a specific transfer clocking; sends out the image data from the N numbers of transfer paths to the interface unit per N-dot portion in parallel at a time in synchronism of a specific transfer clocking; then, in the interface unit, the computer stores in the N numbers of memories the N-dot image data sent out from the N numbers of transfer paths individually; selects the N-dot image data sent out from the N numbers of transfer paths per dot one after another; and sends out the one-dot image data selected one after another to the image formation unit in synchronism with the image formation signal. In this manner, the recording medium is formed to store the image data sending out control program on it.

Here, the one image memory arranged for the image generating unit is provided with (8×N) bits so that the eight-bit data having the depth of 256 gradations for one dot can be sent out per N-dot portion.

The specific transfer clocking whereby to send out the image data from the one image memory to the N numbers of drivers, or from the N numbers of drivers to the N numbers of transfer paths, or from the N numbers of transfer paths to the interface unit, is arranged to synchronizes with the image formation signal.

In synchronism with the specific transfer clocking, the N-dot image data in the main scanning direction are sent out per one-line portion in parallel.

Also, the present invention relates to an image generating device for generating images in accordance with image information generated in the image generating unit in order to send the generated images to the external interface unit, thus forming images in the image formation unit in accordance with the image formation signal. This image generating device is provided with one image memory for storing one image. Then, the image memory is provided with means for sending out the N-dot portion of image data at a time; also with N numbers of drivers that receive from the image memory N numbers of image data one after another each individually; N numbers of transfer paths that receive N numbers of image data from the N numbers of drivers each individually; first sending out control means for controlling the sending out of the image from the one image memory to the N numbers of drivers per N-dot portion in parallel at a time in synchronism with a specific transfer clocking; second sending out control means for controlling the sending out of the image data from the N numbers of drivers to the N numbers of transfer paths per N-dot portion in parallel at a time in synchronism with a specific transfer clocking; third sending out control means for controlling the sending out the image data from the N numbers of transfer paths to the interface unit per N-dot portion in parallel at a time in synchronism with a specific transfer clocking; N numbers of memories provided for the interface unit for storing separately each N-dot image data sent out from the N numbers of transfer paths; selection means for selecting the N dot-data sent out from the N numbers of memories per dot one after another; and fourth sending out control means for controlling the sending out of the one-dot image data thus selected by selection means one after another to the image formation unit in synchronism with the image formation signal.

Here, the one image memory arranged for the image generating unit is provided with (4×N) bits so that the eight-bit data having the depth of sixteen gradations for one dot can be sent out per N-dot portion.

The specific transfer clocking of the first to third sending out control means synchronizes with the clock of the image formation signal generated by the external interface unit.

The second and third sending out control means synchronizes with the specific transfer clocking so as to send out the N-dot image data in the main scanning direction per one-line portion in parallel.

Also, in accordance with the present invention, it is a medium for storing a control program prepared to achieve the object thereof, which controls by a computer to send out the image data generated in an image generating unit to an image formation unit through an interface unit. The control program is such that in an image generating unit the computer sends out the image data from one image memory to the N numbers of drivers per N-dot portion in parallel at a time in synchronism with a specific transfer clocking; sends out the image data from the N numbers of drivers to the N numbers of transfer paths per N-dot portion in parallel at a time in synchronism of a specific transfer clocking; sends out the image data from the N numbers of transfer paths to the interface unit per N-dot portion in parallel at a time in synchronism of a specific transfer clocking; then, in the interface unit, the computer stores in the N numbers of memories the N-dot image data sent out from the N numbers of transfer paths individually; selects the N-dot image data sent out from the N numbers of transfer paths per dot one after another; and sends out the one-dot image data selected one after another to the image formation unit in synchronism with the image formation signal. In this manner, the recording medium is formed to store the image data sending out control program on it.

Here, the one image memory arranged for the image generating unit is provided with (4×N) bits so that the eight-bit data having the depth of sixteen gradations for one dot can be sent out per N-dot portion.

The specific transfer clocking whereby to send out the image data from the one image memory to the N numbers of drivers, or from the N numbers of drivers to the N numbers of transfer paths, or from the N numbers of transfer paths to the interface unit, is arranged to synchronizes with the image formation signal.

In synchronism with the specific transfer clocking, the N-dot image data in the main scanning direction are sent out per one-line portion in parallel.

Also, the present invention relates to an image processing system that generates images in accordance with image information in the image generating unit, and sends the images thus generated to the interface unit for the formation of images in the image formation unit in accordance with image formation signal. This system comprises the N numbers of image memories provided for the image generating unit for storing one image divided into N images each individually; N numbers of drivers that separately receive the image data divided into N images sent out from the N numbers of image memories; N numbers of transfer paths that separately receive the N-dot image data sent out from the N numbers of drivers individually; first sending out control means for controlling the sending out of the image data from the N numbers of image memories to the N numbers of drivers per N-dot portion in parallel at a time in synchronism with a specific transfer clocking; second sending out control means for controlling the sending out the image data from the N numbers of drivers to the N numbers of transfer paths per N-dot portion in parallel at a time; third sending out control means for controlling the sending out the image data from the N numbers of transfer paths to the interface unit per N-dot portion in parallel at a time in synchronism with a specific transfer clocking; N numbers of memories provided for the interface unit for separately storing the N-dot image data sent out from the N numbers of memories individually; selection means for selecting the N-dot image data sent out from the N numbers of memories per dot one after another; and fourth sending out control means for controlling the sending out the one-dot image data selected by the selection means one after another to the image formation unit in synchronism with the image formation signal. In this manner, the image processing system is structured.

Here, the specific transfer clocking of the first to third sending out control means synchronizes with the 1/N clock of the image formation signal generated by the fourth sending out control means.

The first to the third sending out control means sends out the N-dot image data in the main scanning direction per one-line portion in parallel in synchronism with the specific transfer clocking.

Also, the present invention relates to an image processing system that generates images in accordance with image information in the image generating unit, and sends the images thus generated to the interface unit for the formation of images in the image formation unit in accordance with image formation signal. This system comprises one image memory provided for the image generating unit for storing one image; data dividing means for dividing one image sent out from the image memory into N images one after another; N numbers of drivers that separately receive the image data divided into N images by the data dividing means one after another individually; N numbers of transfer paths that separately receive the N-dot image data sent out from the N numbers of drivers individually; first sending out control means for controlling the sending out of one image data from the one image memory to the data dividing means in synchronism with a specific transfer clocking; second sending out control means for controlling the sending out of the image data from the data dividing means to the N numbers of drivers per N-dot portion in parallel at a time; third sending out control means for controlling the sending out of the image data from the N numbers of drivers to the N numbers of transfer paths per N-dot portion in parallel at a time in synchronism with a specific transfer clocking; fourth sending out control means for controlling the sending out of the image data from the N numbers of transfer paths to the interface unit per N-dot portion in parallel at a time in synchronism with a specific transfer clocking; N numbers of memories provided for the interface unit for separately storing N-dot image data sent out from N numbers of transfer paths individually; selection means for selecting the N-dot image data sent out from the N numbers of memories per dot one after another; and fifth sending out control means for controlling the sending out of the one-dot image data selected by the selection means one after another to the image formation unit in synchronism with the image formation signal. In this manner, the image processing system is structured.

Here, the specific transfer clocking of the first to third sending out control means synchronizes with the 1/N clock of the image formation signal generated by the fourth sending out control means.

The first to the third sending out control means sends out the N-dot image data in the main scanning direction per one-line portion in parallel in synchronism with the specific transfer clocking.

Also, the present invention relates to an image processing system that generates images in accordance with image information in the image generating unit, and sends the images thus generated to the interface unit for the formation of images in the image formation unit in accordance with image formation signal. This system comprises one image memory provided for the image generating unit for storing one image; data dividing means for dividing one image sent out from the image memory into N images one after another; N numbers of drivers that separately receive the image data divided into N images by the data dividing means one after another individually; N numbers of transfer paths that separately receive the N-dot image data sent out from the N numbers of drivers individually; first sending out control means for controlling the sending out of one image data from the one image memory to the data dividing means in synchronism with a specific transfer clocking; second sending out control means for controlling the sending out of the image data from the data dividing means to the N numbers of drivers per N-dot portion in parallel at a time; third sending out control means for controlling the sending out the image data from the N numbers of drivers to the N numbers of transfer paths per N-dot portion in parallel at a time in synchronism with a specific transfer clocking; fourth sending out control means for controlling the sending out of the image data from the N numbers of transfer paths to the interface unit per N-dot portion in parallel at a time in synchronism with a specific transfer clocking; N numbers of memories provided for the interface unit for separately storing N-dot image data sent out from N numbers of transfer paths individually; selection means for selecting the N-dot image data sent out from the N numbers of memories per dot one after another; and fifth sending out control means for controlling the sending out of the one-dot image data selected by the selection means one after another to the image formation unit in synchronism with the image formation signal. In this manner, the image processing system is structured.

Here, the specific transfer clocking of the first sending out control means synchronizes with the clock of the image formation signal generated by the fifth sending out control means, and the specific transfer clocking of the second to fourth sending out control means synchronizes with 1/N clock of the image formation signal generated by the fifth sending out control means.

The second to the fourth sending out control means sends out the N-dot image data in the main scanning direction per one-line portion in parallel in synchronism with the specific transfer clocking.

Also, the present invention relates to an image generating device that generates images in accordance with image information in the image generating unit, and sends the images thus generated to the external interface unit for the formation of images in the image formation unit in accordance with image formation signal. This device comprises the N numbers of image memories provided for the image generating unit for storing one image divided into N images each individually; N numbers of drivers that separately receive the image data divided into N images sent out from the N numbers of image memories; N numbers of transfer paths that separately receive the N-dot image data sent out from the N numbers of drivers individually; first sending out control means for controlling the sending out of the image data from the N numbers of image memories to the N numbers of drivers per N-dot portion in parallel at a time in synchronism with a specific transfer clocking; second sending out control means for controlling the sending out the image data from the N numbers of drivers to the N numbers of transfer paths per N-dot portion in parallel at a time; and third sending out control means for controlling the sending out the image data from the N numbers of transfer paths to the external interface unit per N-dot portion in parallel at a time in synchronism with a specific transfer clocking. In this manner, the image generating device is structured.

Here, the specific transfer clocking of the first to third sending out control means synchronizes with the 1/N clock of the image formation signal generated by the external interface unit.

The first to the third sending out control means sends out the N-dot image data in the main scanning direction per one-line portion in parallel in synchronism with the specific transfer clocking.

Also, the present invention relates to an image generating device that generates images in accordance with image information in the image generating unit, and sends the images thus generated to the external interface unit for the formation of images in the image formation unit in accordance with image formation signal. This device comprises one image memory provided for the image generating unit for storing one image; data dividing means for dividing one image sent out from the image memory into N images one after another; N numbers of drivers that separately receive the image data divided into N images by the data dividing means one after another individually; N numbers of transfer paths that separately receive the N-dot image data sent out from the N numbers of drivers individually; first sending out control means for controlling the sending out of one image data from the one image memory to the data dividing means in synchronism with a specific transfer clocking; second sending out control means for controlling the sending out of the image data from the data dividing means to the N numbers of drivers per N-dot portion in parallel at a time; third sending out control means for controlling the sending out the image data from the N numbers of drivers to the N numbers of transfer paths per N-dot portion in parallel at a time in synchronism with a specific transfer clocking; and fourth sending out control means for controlling the sending out of the image data from the N numbers of transfer paths to the interface unit per N-dot portion in parallel at a time in synchronism with a specific transfer clocking. In this manner, the image generating device is structured.

Here, the specific transfer clocking of the first sending out control means synchronizes with the clock of the image formation signal generated by the external interface unit, and the specific transfer clocking of the second to fourth sending out control means the 1/N clock of the image formation signal generated by the external interface.

The second to fourth sending out control means sends out the N-dot image data in the main scanning direction per one-line portion in parallel in synchronism with the specific transfer clocking.

Also, in accordance with the present invention, it is a medium for storing a control program prepared to achieve the object thereof, which controls by a computer to send out the image data generated in an image generating unit to an image formation unit through an interface unit. The control program is such that in an image generating unit the computer sends out the image data from the N numbers of image memories to the N numbers of drivers per N-dot portion in parallel at a time in synchronism with a specific transfer clocking; sends out the image data from the N numbers of drivers to the N numbers of transfer paths per N-dot portion in parallel at a time in synchronism of a specific transfer clocking; sends out the image data from the N numbers of transfer paths to the interface unit per N-dot portion in parallel at a time in synchronism of a specific transfer clocking; then, in the interface unit, the computer stores in the N numbers of memories the N-dot image data sent out from the N numbers of transfer paths individually; selects the N-dot image data sent out from the N numbers of transfer paths per dot one after another; and sends out the one-dot image data selected one after another to the image formation unit in synchronism with the image formation signal. In this manner, the recording medium is formed to store the image data sending out control program on it.

Here, the specific transfer clocking whereby to send out the image data from the N numbers of image memories to the N numbers of drivers, or from the N numbers of drivers to the N numbers of transfer paths, or from the N numbers of transfer paths to the interface unit, is arranged to synchronizes with 1/N clock of the image formation signal.

Also, in accordance with the present invention, it is a medium for storing a control program prepared to achieve the object thereof, which controls by a computer to send out the image data generated in an image generating unit to an image formation unit through an interface unit. The control program is such that in an image generating unit the computer sends out one image data from one image memory to data dividing means in synchronism with a specific transfer clocking; sends out the image data from the data dividing means to the N numbers of drivers per N-dot portion in parallel at a time in synchronism of a specific transfer clocking; sends out the image data from the N numbers of drivers to the N numbers of transfer paths unit per N-dot portion in parallel at a time in synchronism of a specific transfer clocking; sends out the image data from the N numbers of transfer paths to the interface unit per N-dot portion in parallel at a time; then, in the interface unit, the computer stores in the N numbers of memories the N-dot image data sent out from the N numbers of transfer paths individually; selects the N-dot image data sent out from the N numbers of transfer paths per dot one after another; and sends out the one-dot image data selected one after another to the image formation unit in synchronism with the image formation signal. In this manner, the recording medium is formed to store the image data sending out control program on it.

Here, the specific transfer clocking whereby to send out the image data from the one image memory to the data dividing means synchronizes with the clock of the image formation signal, and the specific transfer clocking whereby to send out the image data form the data dividing means to the N numbers of drivers, or from the N numbers of drivers to the N numbers of transfer paths, or from the N numbers of transfer paths to the interface unit, is arranged to synchronizes with 1/N clock of the image formation signal.

In synchronism with the specific transfer clocking, the N-dot image data in the main scanning direction are sent out per one-line portion in parallel.

DETAILED DESCRIPTION OF THE PREFERRED EMBODIMENTS

Hereinafter with reference to the accompanying drawings, the detailed description will be made of the embodiments in accordance with the present invention.

(First Embodiment)

Figure 1:
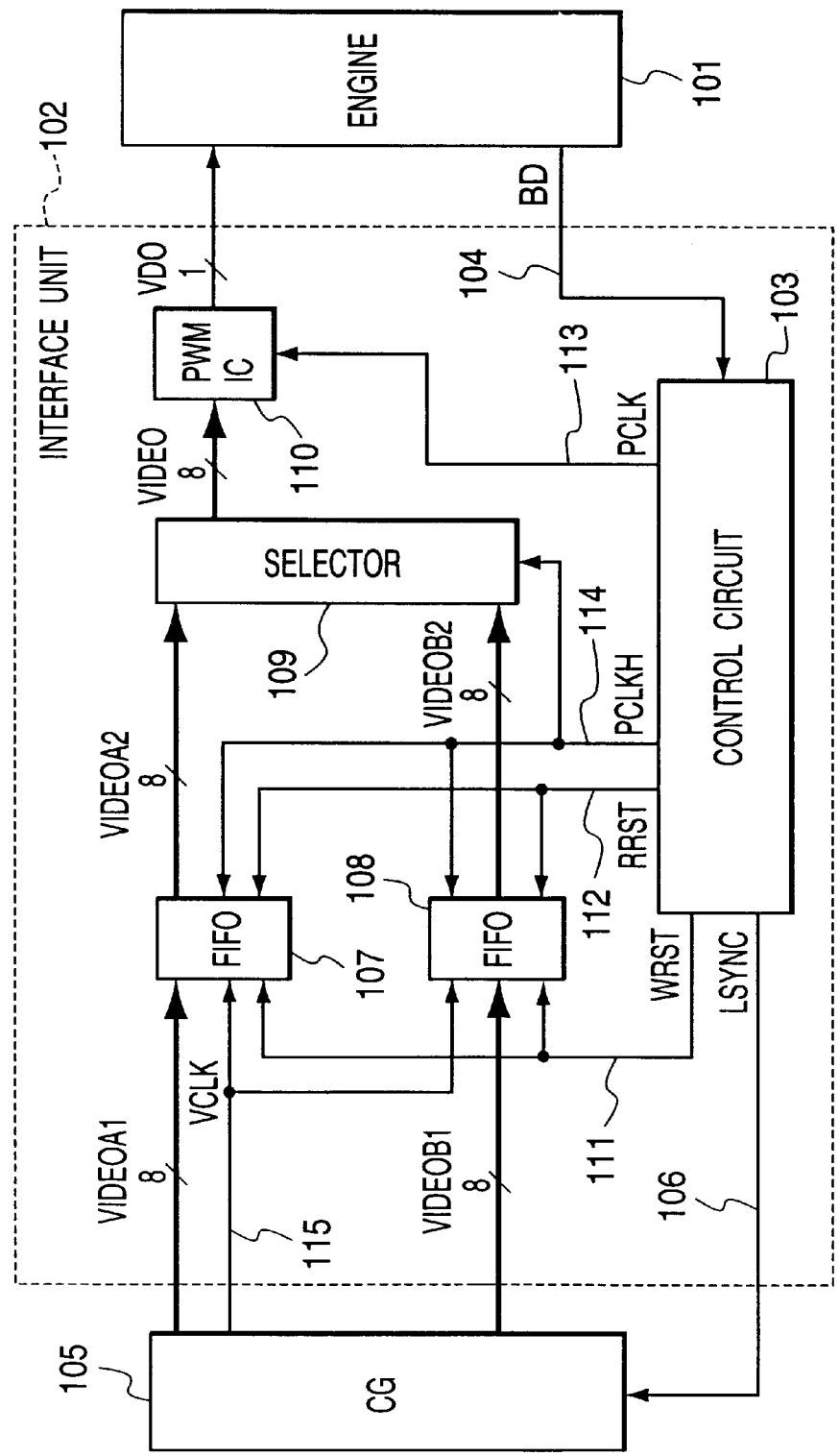
FIG. 1 is a view which shows the structure of an image generating system in accordance with a first embodiment of the present invention.
Figure 19:
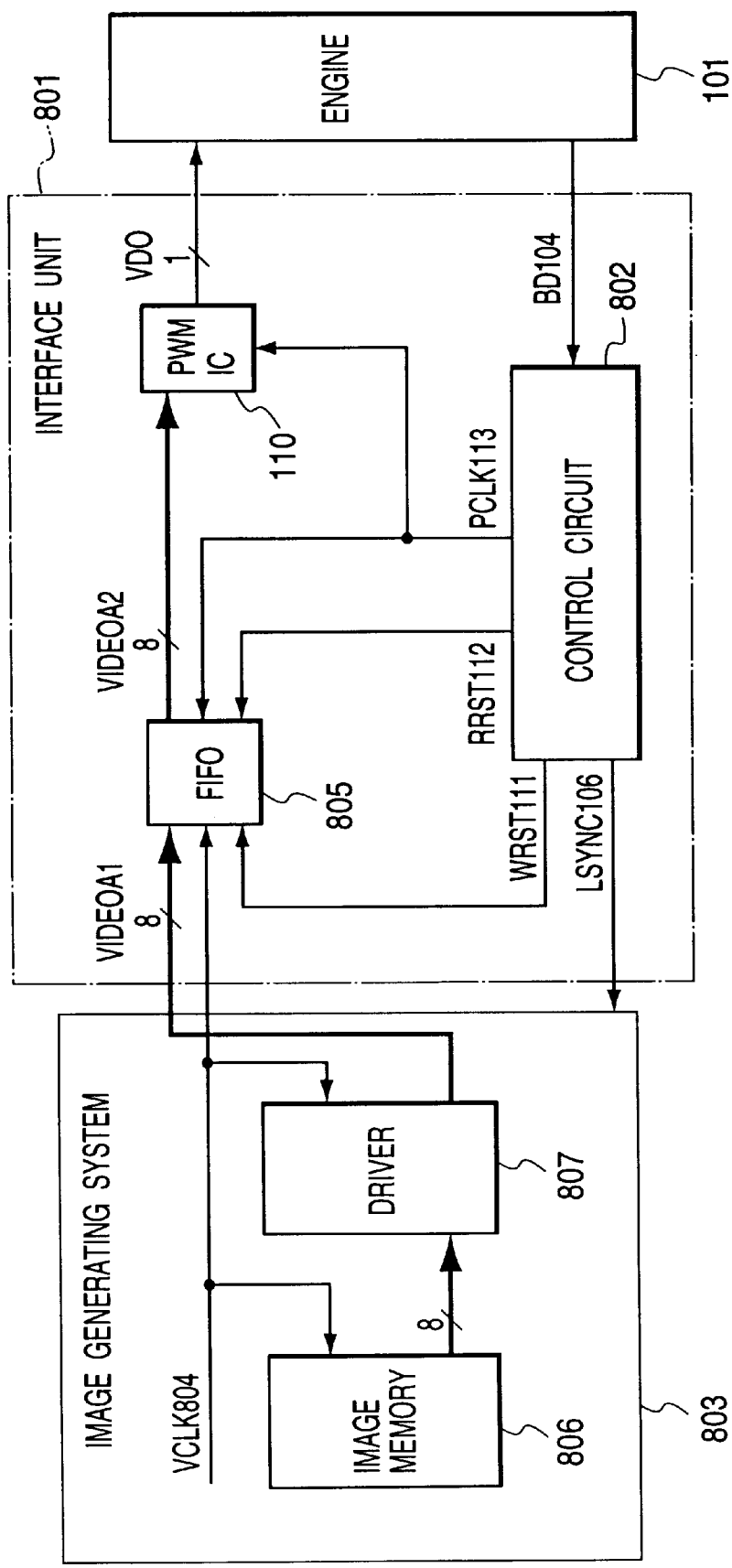
FIG. 19 is a block diagram which shows the structural examples of the conventional image generating system and image formation system.
Figure 20:
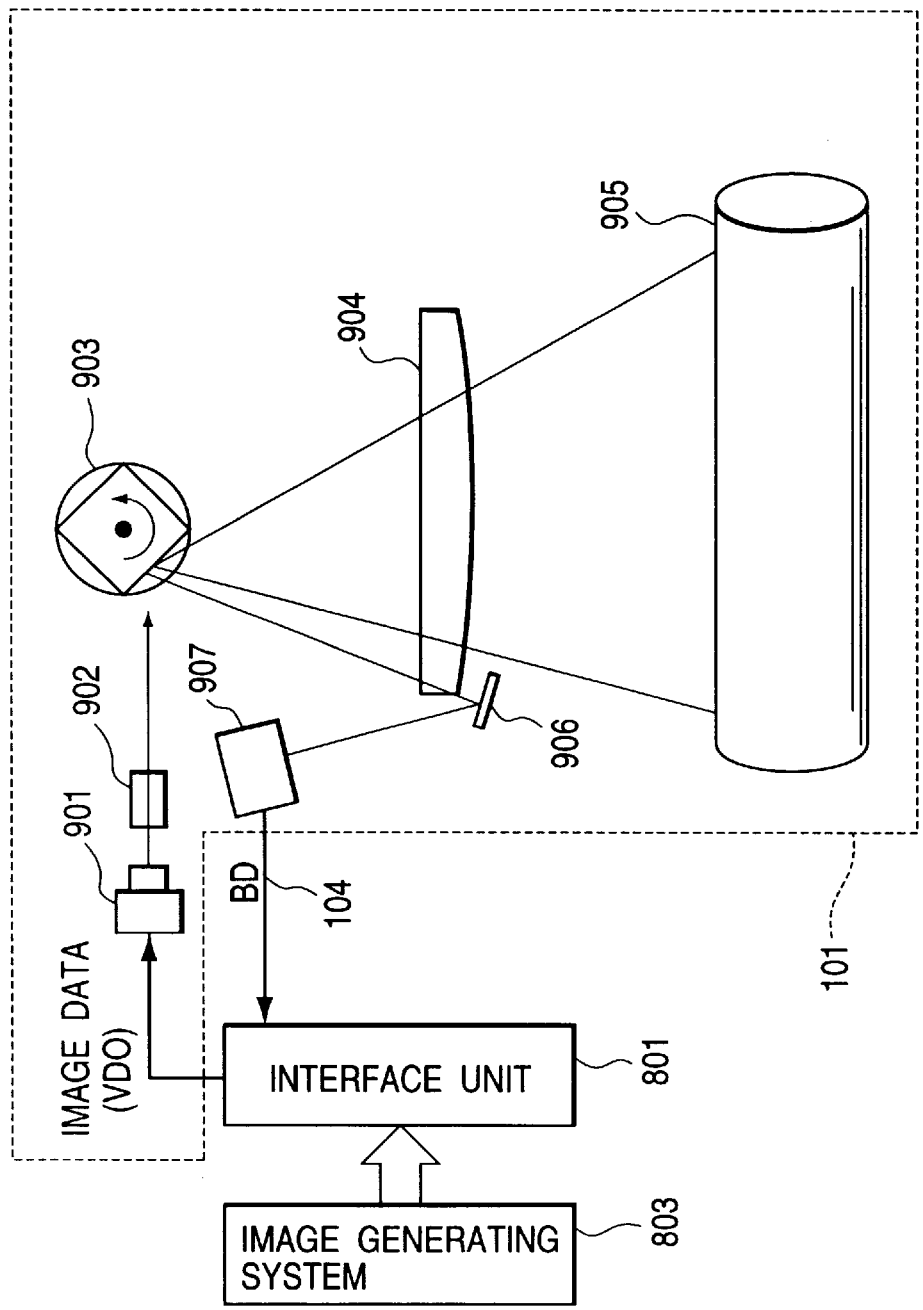
FIG. 20 is a block diagram which shows the structural example of the conventional engine.
Figure 21:
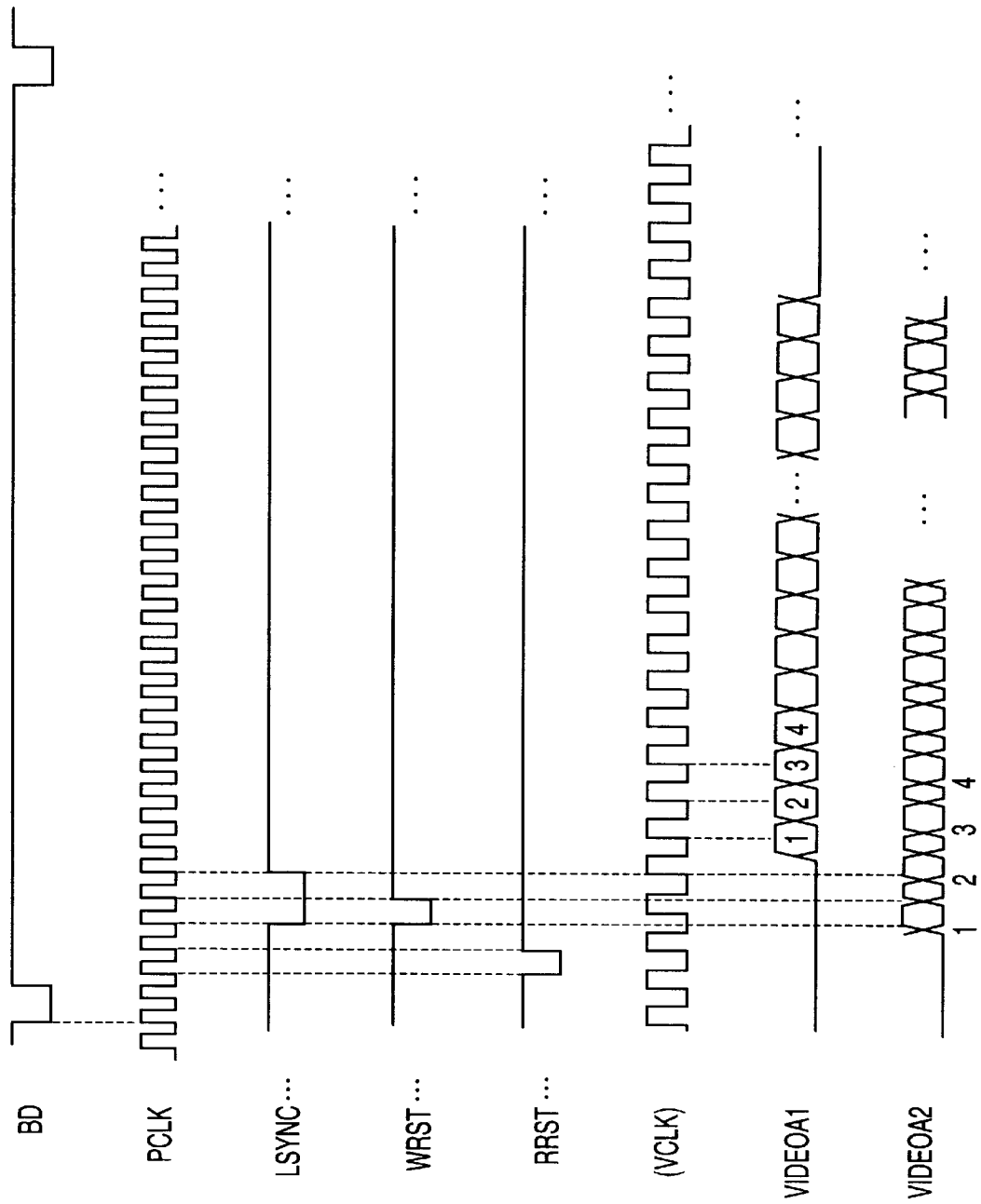
FIG. 21 is a timing chart which shows the timing of the operations of each of the conventional control signals and data.

FIG. 1 is a view which shows the structure of an image generating system in accordance with a first embodiment of the present invention. In this respect, the same reference marks are applied to the same members appearing in FIG. 19, and the description thereof will be omitted. Also, with respect to the structure and operation of the engine 101, the description has been made in conjunction with FIG. 20. Therefore, the description thereof will be omitted.

Figure 2:
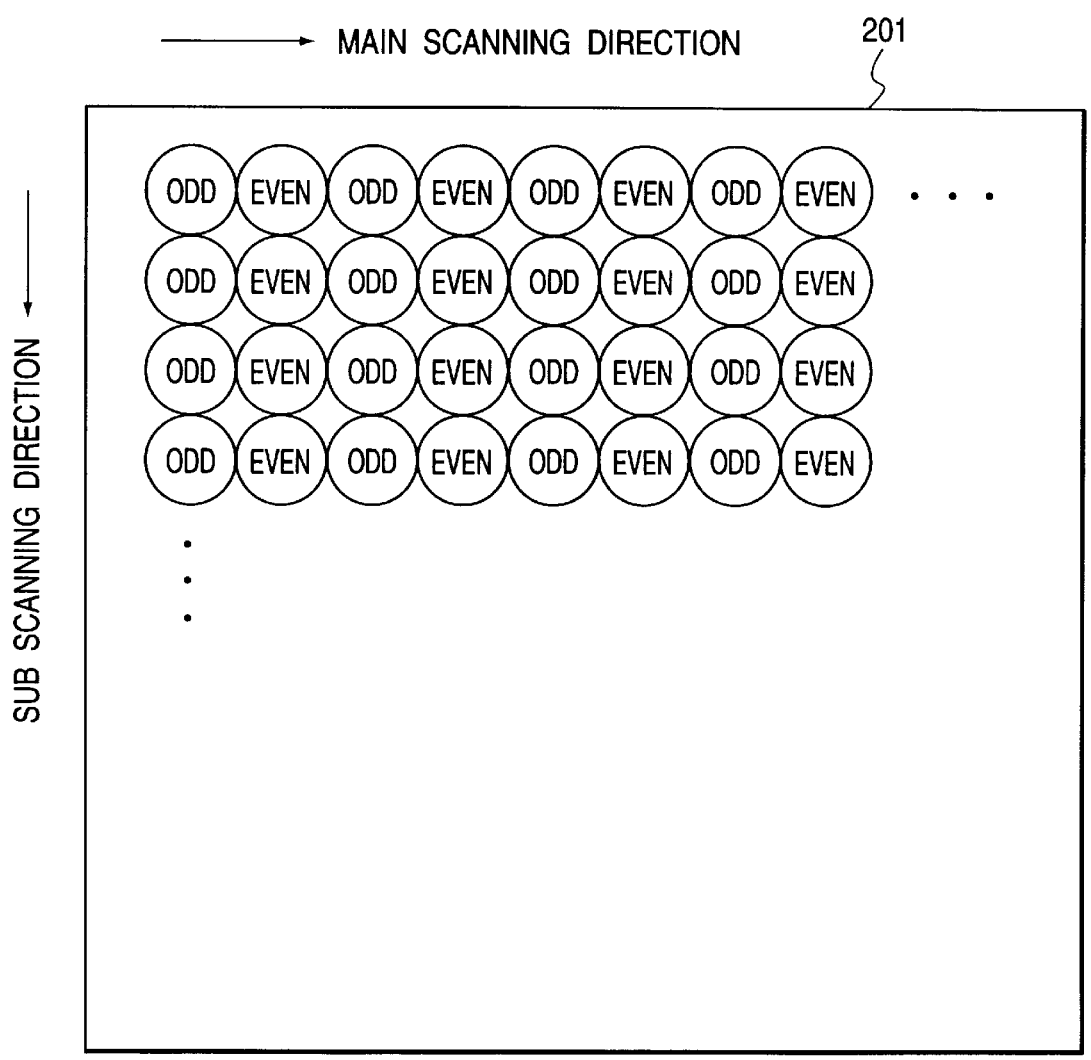
FIG. 2 is a view which illustrates the printing output to a recording sheet in accordance with the first embodiment.

As shown in FIG. 1, the interface unit 102 is provided with two FIFO memories 107 and 108, a selector 109, a PWM IC 110, and a control circuit 103. Here, the control circuit 103 generates from the BD signals 104, the LSYNC signal 106; the resetting signals (write reset) 111 for the FIFOs 107 and 108; the RRST (read reset) 112; the clock PCLK 113 which is in synchronism with the BD signals; and the clock PCLKH 114 whose frequency is ½ of the frequency of the clock PCLK 113. Also, the LSYNC signals 106 are transmitted to the CG 105. The PCLK 113 is transmitted to the PWM IC 110. The PCLKH 114 is transmitted to the FIFOs 107 and 108, and to the selector 109. The CG 105 is structured to sweep out data per two-dot portion. In other words, the CG 105 can sweep out data per two-dot portion having an odd number and an even number each as shown in FIG. 2 when the odd and even numbers are put side by side in the main scanning direction on a printing sheet 201.

With the structure arranged as above, one line portion of the multivalued image data is written on the FIFOs 107 and 108 per two-dot portion, at first, in synchronism with the arbitrary clock (hereinafter referred to as VCLK) 115 transmitted from the CG 105. For example, the odd numbered data are written on the FIFO 107, and the even numbered data are written on the FIFO 108. In this respect, it should be arranged to make the frequency of the VCLK 115 higher than the frequency that enables the one line portion of image data to be transferred within the period of the BD cycle. However, since the data are transferred per two-dot portion, the frequency of the VCLK 115 may be ½ of the conventional frequency at which one-dot portion of data is transferred. The multivalued image data written on the FIFOs 107 and 108 are read out by the PCLKH 114 to be transferred to the selector 109. The selector 109 selects the FIFO 107 or the FIFO 108 by means of the PCLKH 114, and sweeps out the selected one to the PWM IC 110. In the PWM IC 110, the multivalued image data are converted into the binary image data. Then, the binary data are transferred by the PCLK 113 to the engine 101 to generate images.

Figure 3:
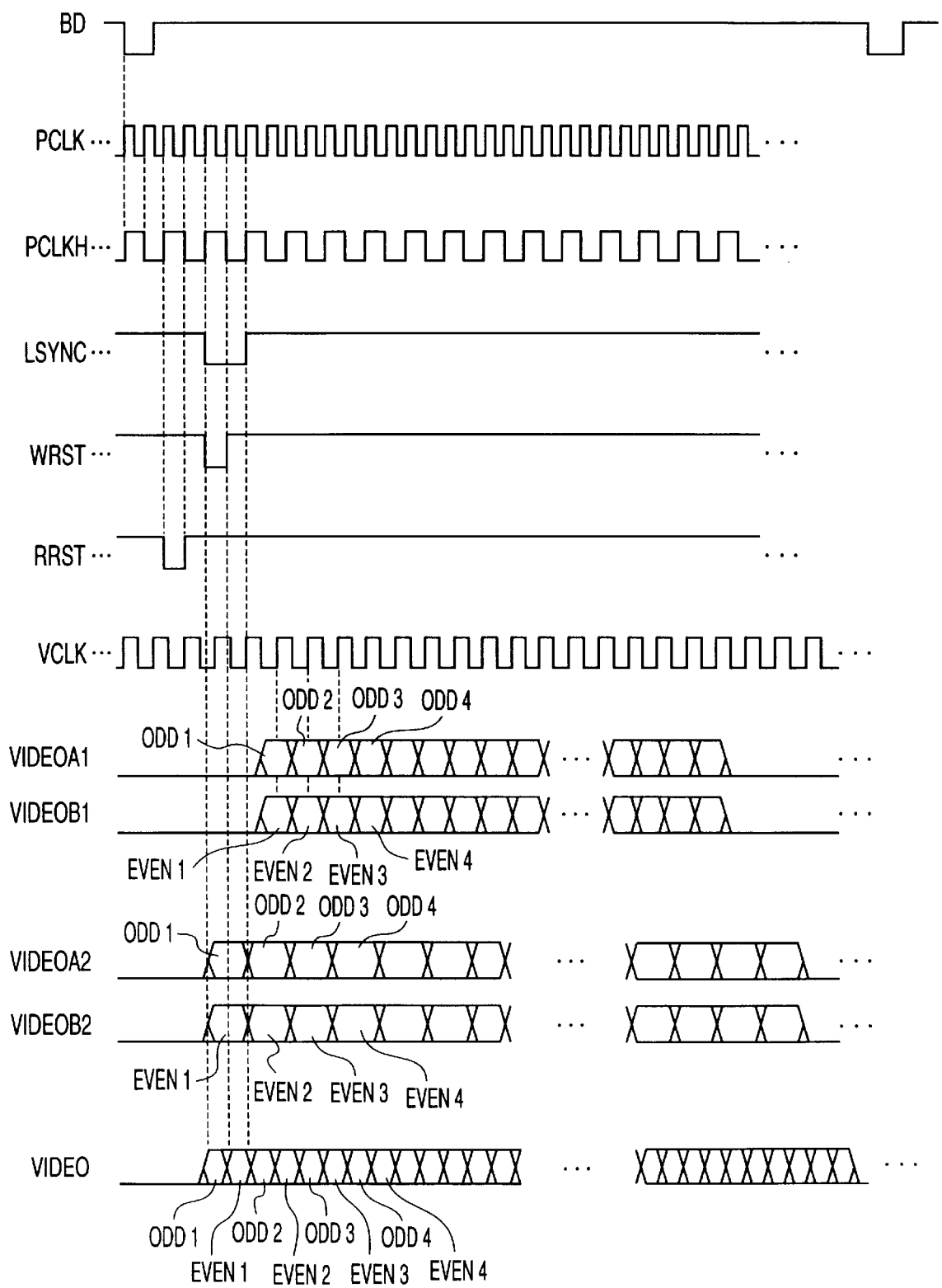
FIG. 3 is a timing chart of an interface unit in accordance with the first embodiment.

FIG. 3 is a timing chart of the VCLK 115 and VIDEO signals generated in the control circuit 103. Here, the VIDE signals carry image data. The PCLK 113 synchronizes with the fall of the BD 104. The PCLKH 114 is ½ cycle of the PCLK 113. The PCLKH 114 and PCLK 113 have the same phase. The LSYNC 106, WRST 111, RRST 112 are output from the control circuit 103 at the timing indicated in FIG. 3. When the CG 105 receives the LSYNC 106, it sweeps out the VIDEOA1 and VIDEOB1 to be written on the FIFOs 107 and 108, respectively. Before the VIDEOA1 and VIDEOB1 are swept out, the FIFOs 107 and 108 are reset by the application of WRST 111. At the timing of the RRST 112, the VIDEOA2 and VIDEOB2 are read out, and then, by means of the selector 109, the odd 1, odd 2, odd 3, . . . , are output if the PCLKH 114 is at a higher level, and the even 1, even 2, even 3, . . . , . . . , are output if the PCLKH 114 is at a lower level. In this manner, the odd 1, even 1, odd 2, even 2, odd 3, even 3, . . . , . . . , are output in that order. The VIDEOA2 and VIDEOB2 are the data which are written on the FIFOs 107 and 108 during the intervals between the last BD signals. The VIDEOA2 and VIDEOB2 are read out from the FIFOs 107 and 108 during the intervals between the next BD signals.

Also, in the interface unit 102, it is structured to arrange the PWM IC 110 after the selector 109. Also, the buffers that store the binary image data may be arranged for the FIFOs 107 and 108 that store the multivalued image data. The PWM IC 110 may be a clock synchronous buffer.

In this respect, if the image data from the CG 105 are the binary ones, buffers are used in place of the FIFOs and PWM IC, and then, the image data are transferred to the engine 101 through the interface unit 102.

(Second Embodiment)

Figure 4:
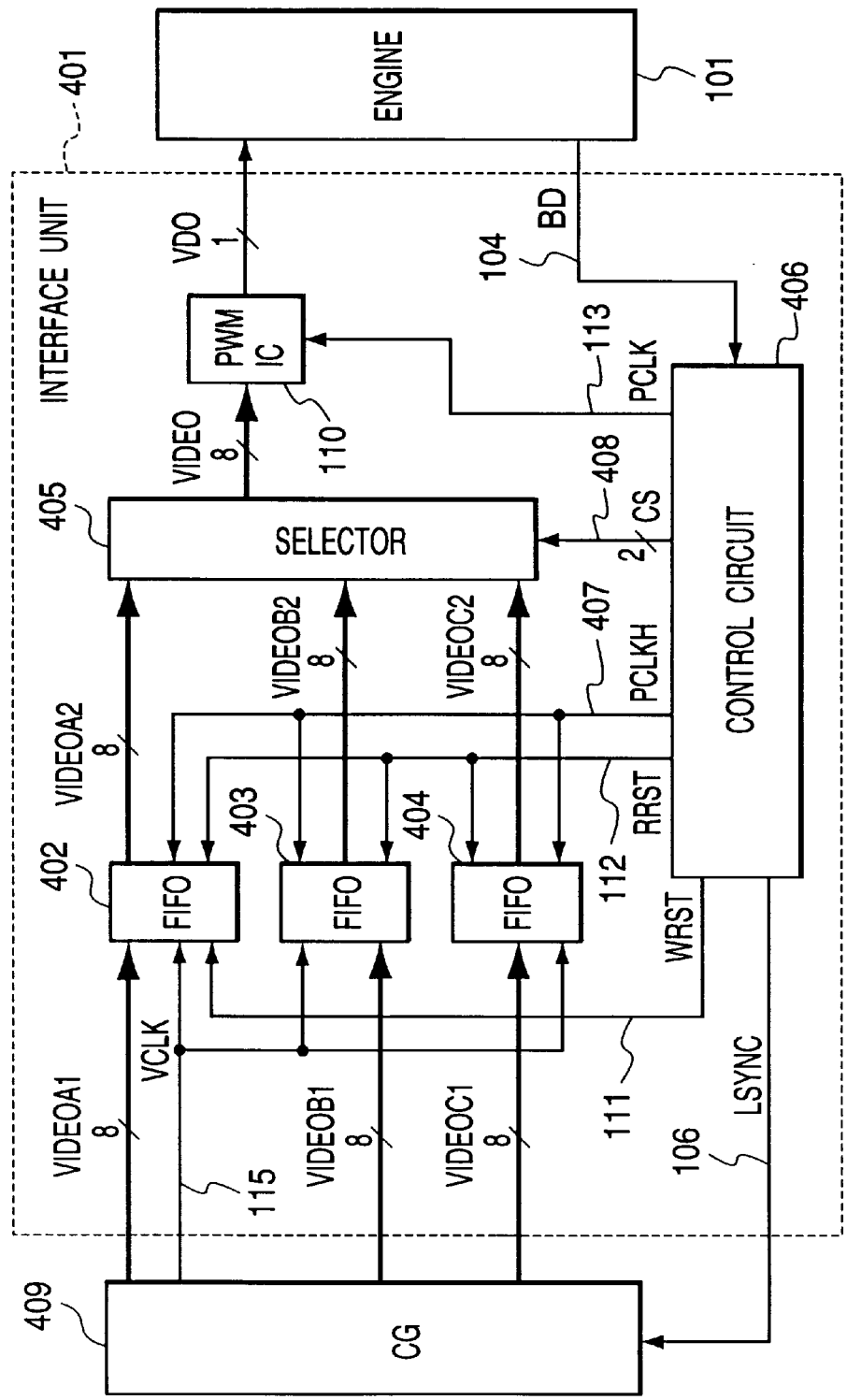
FIG. 4 is a view which shows the structure of an image generating system in accordance with a second embodiment of the present invention.

FIG. 4 is a view which shows the structure of an image generating system in accordance with a second embodiment of the present invention. In this respect, the same reference marks are applied to the same members appearing in FIG. 14, and the description thereof will be omitted. Also, with respect to the structure and operation of the engine 101, the description has been made in conjunction with FIG. 15. Therefore, the description thereof will be omitted.

Figure 5:
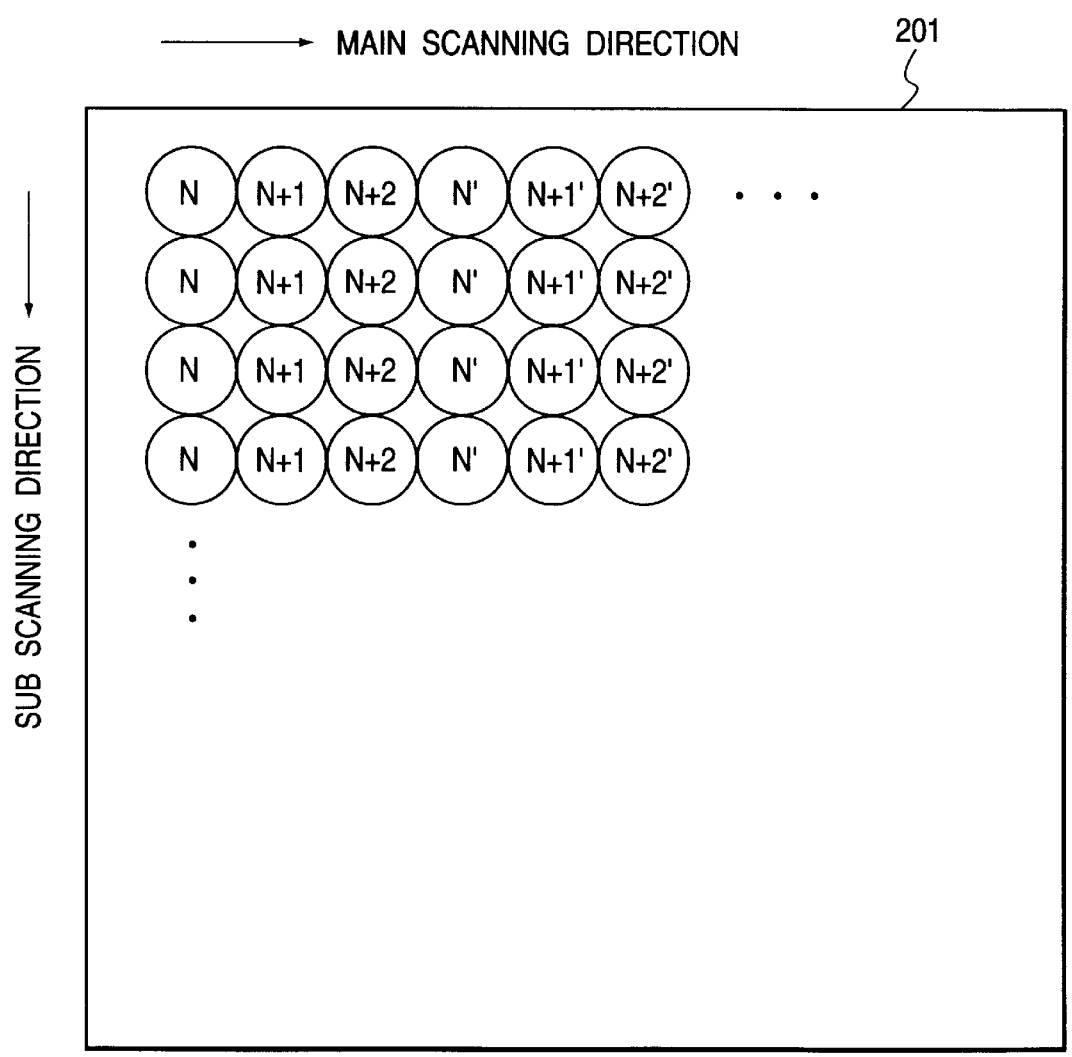
FIG. 5 is a view which illustrates the printing output to a recording sheet in accordance with the second embodiment.

As shown in FIG. 4, the interface unit 401 is provided with three FIFO memories 402, 403, and 404, a selector 405, a PWM IC 110, and a control circuit 406. Here, the control circuit 406 generates from the BD signals 104, the LSYNC signal 106; the resetting signals (write reset) 111 for the FIFOs 402, 403, and 404; the RRST (read reset) 112; the clock PCLK 113 which is in synchronism with the DB signals; the clock PCLKH 114 whose frequency is ⅓ of the frequency of the clock PCLK 113; and the control signal CS 408 that selects either one of FIFOs 402, 403, and 404 with respect to the selector 405. Also, the LSYNC signals 106 are transmitted to the CG 409. The PCLK 113 is transmitted to the PWM IC 110. The PCLKH 407 is transmitted to the FIFOs 402, 403, and 404, and the CS 408 is transmitted to the selector 405. The CG 409 is structured to sweep out data per three-dot portion. In other words, as shown in FIG. 5, the data on the three dots of the nth dot, n+first dot, and n+second dot can be swept out at a time if the nth dot, n+first dot, and n+second dot are arranged on a printing sheet 201 in the main scanning direction.

With the structure arranged as above, one line portion of the multivalued image data is written on the FIFOs 402, 403, and 404 per three-dot portion, at first, in synchronism with the arbitrary clock (hereinafter referred to as VCLK) 115 transmitted from the CG 105. For example, the nth data are written on the FIFO 402, and the n+first data written on the FIFO 403, and then, the n+second data are written on the FIFO 404. In this respect, it should be arranged to make the frequency of the VCLK 410 higher than the frequency that enables the one line portion of image data to be transferred within the period of the BD cycle. However, since the data are transferred per three-dot portion, the frequency of the VCLK 115 may be ⅓ of the conventional frequency at which one-dot portion of data is transferred. The multivalued image data written on the FIFOs 402, 403, and 404 are read out by the PCLKH 407 to be transmitted to the selector 405. The selector 405 selects the FIFO 402 or FIFO 403, or FIFO 404 by means of the CS 408, and sweeps out the selected one to the PWM IC 110. In the PWM IC 110, the multivalued image data are converted into the binary image data. Then, the binary data are transferred by the PCLK 113 to the engine 101 to generate images.

Figure 6:
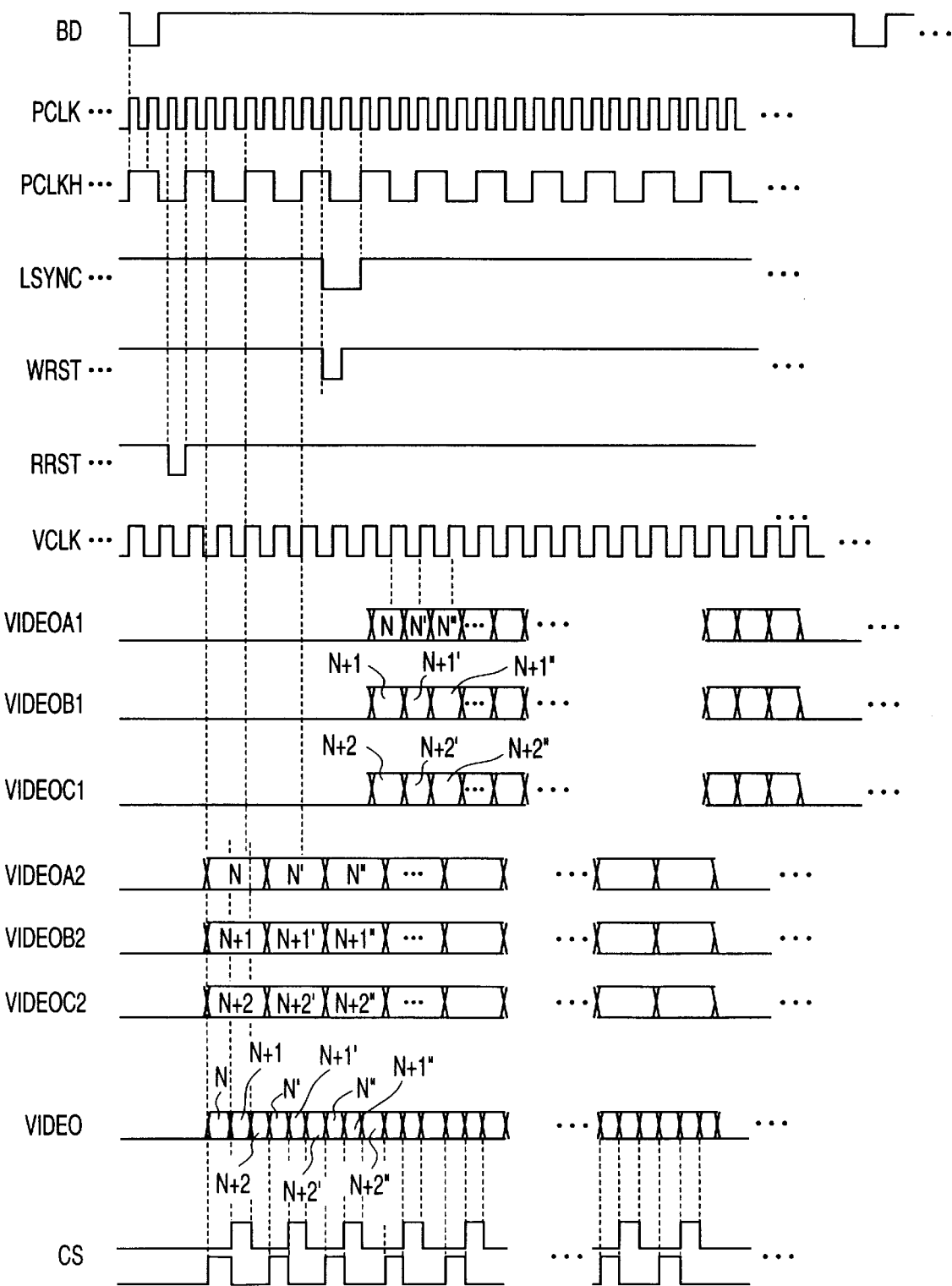
FIG. 6 is a timing chart of an interface unit in accordance with the second embodiment.

FIG. 6 is a timing chart of the signals generated by the control circuit 406. The VIDEO signals carry image data. The PCLK 113 synchronizes with the fall of the BD 104.

The PCLKH 407 is ½ cycle of the PCLK 113. The PCLKH 114 and PCLK 113 have the same phase. The LSYNC 106, WRST 111, RRST 112 are output from the control circuit 406 at the timing indicated in FIG. 6. When the CG 409 receives the LSYNC 106, it sweeps out the VIDEOA1, VIDEOB1, and VIDEOC1 to be written on the FIFOs 402, 403, and 404, respectively. Before the VIDEOA1, VIDEOB1, and VIDEOC1 are swept out, the FIFOs 402, 403, and 404 are reset by the application of WRST 111. At the timing of the RRST 112, the VIDEOA2, VIDEOB2, and VIDEOC2 are read out, and then, by means of the selector 405, the N, N+1, N+2, N', N+1', N+2', N", N+1", N+2", . . . are output in that order by the application of the two-bit CS 408. Here, the output synchronizes with the PCLKH 113. The CS 408 are those signals shown in FIG. 6, for example. The VIDEOA2, VIDEOB2, and VIDEOC2 are the data which are written on the FIFOs 402, 403, and 404 during the intervals between the last BD signals. The VIDEOA2, VIDEOB2, and VIDEOC2 are read out from the FIFOs 402, 403, and 404 during the intervals between the next BD signals.

Also, in the interface unit 401, it is structured to arrange the PWM IC 110 after the selector 109. Also, the buffers that store the binary image data may be arranged for the FIFOs 402, 403, and 404 that store the multivalued image data. The PWM IC 110 may be a clock synchronous buffer.

In this respect, if the image data from the CG 105 are the binary ones, buffers are used in place of the FIFOs and PWM IC, and then, the image data are transferred to the engine 101 through the interface unit 401.

Also, if the number of the data swept out from the CG at a time as an Nth in synchronism with the clock, it may be possible to define the number of FIFOs of the interface unit as an Nth, thus making the frequency of the VCLK as 1/N times.

As described above, in accordance with the present embodiment, the image data are swept out from the CG per N dot portion. Then, while arranging the FIFOs or butter of the interface unit to N numbers, it becomes possible to define the transfer speed of the CG as 1/N. Therefore, even if the image clocking of the engine becomes faster, the transfer speed of data to be swept out from the CG can be made slower.

Also, by making the clock with respect to the FIFOs or buffer and the clock with respect to the PWM IC or buffer the same phase, it is possible to reduce the numbers of selectors with the arrangement that enables the PWM IC or buffer to be operative after the selectors.

In this respect, it may be possible to apply the present invention to a system structured by a plurality of equipment (such as, a host computer, an interface device, a reader, and a printer) or to apply it to a single equipment (such as a copying machine, a facsimile).

Here, of course, it is possible to achieve the objectives of the present invention in such a manner that a storage medium, which is provided with the programming codes of the software for materializing the functions of the embodiment described above, is supplied to a system or an apparatus, and that the system or the computer (CPU or MPU) of such apparatus reads out the stored programming codes for the execution thereof.

In this case, the programming codes read out from the storage medium themselves materialize the functions of the embodiment described above. It is to be understood, therefore, that the storage medium that stores such programming codes constitutes the present invention.

For each of the storage media that supply the programming codes, a floppy disk, a hard disk, an optical disk, a magneto-optic disk, a CD-ROM, a CD-R, a magnetic tape, a non-volatile memory card, and a ROM can be used, among some others.

Also, not only, a computer can execute the programming codes thus read out to materialize the functions of the embodiment described above, but an OS (operating system) or the like that operates on the computer as instructed in accordance with the programming codes, thus executing the actual processing partly or totally. It is of course included in the scope of the present invention if the functions of the embodiment described above are materialized by the execution of such actual processing.

Further, the programming codes read from the storage medium are written on a memory provided for the functional extension board inserted into a computer or provided for the functional extension unit connected with a computer, and then, the CPU or the like arranged on such functional extension board or functional extension unit executes the actual processing partly or totally. It is of course included in the scope of the present invention if the functions of the embodiment described above are materialized by the execution of such actual processing.

(Third Embodiment)

Figure 8:
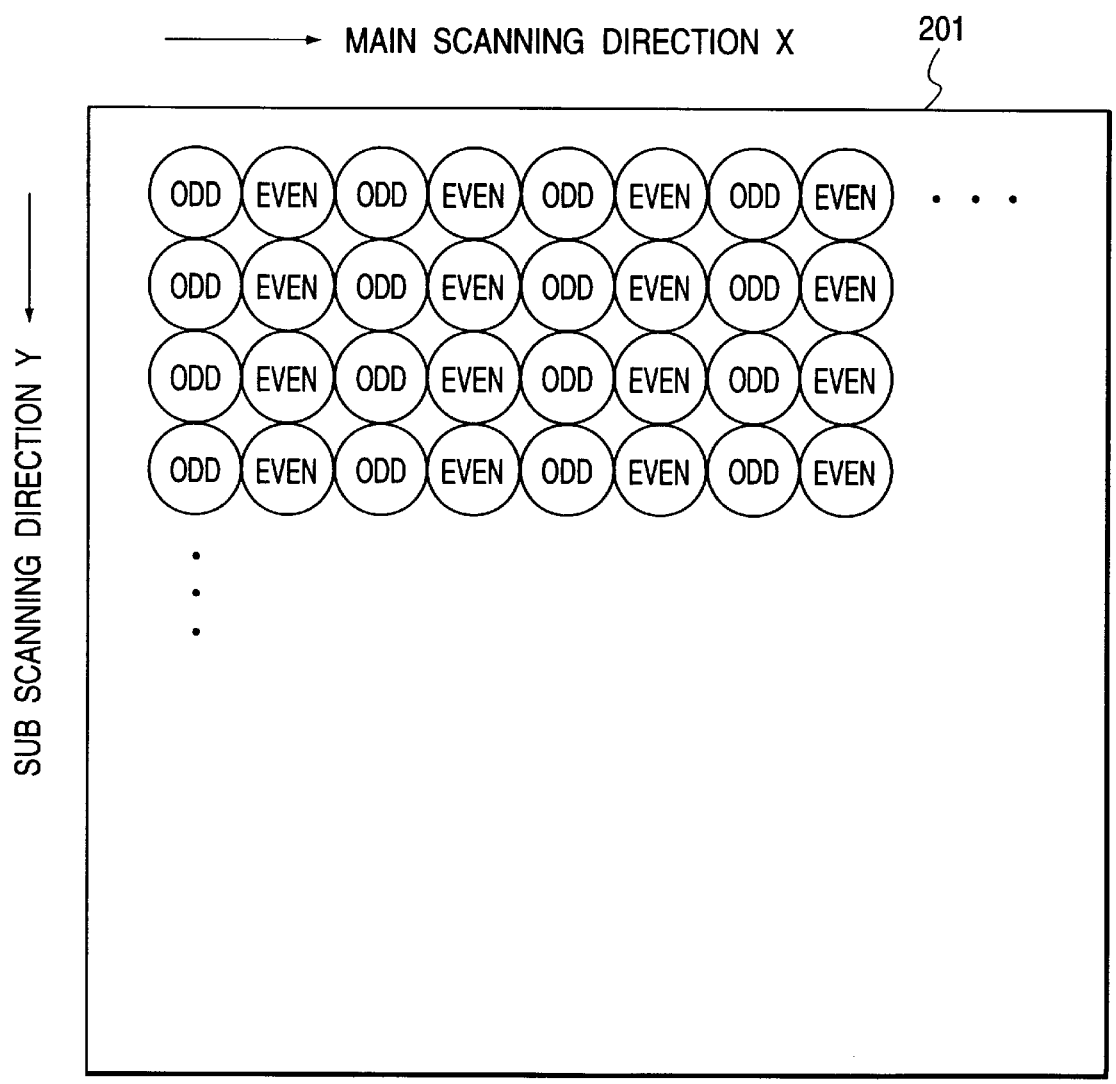
FIG. 8 is a view which illustrates the printing out to a recording sheet.
Figure 9:
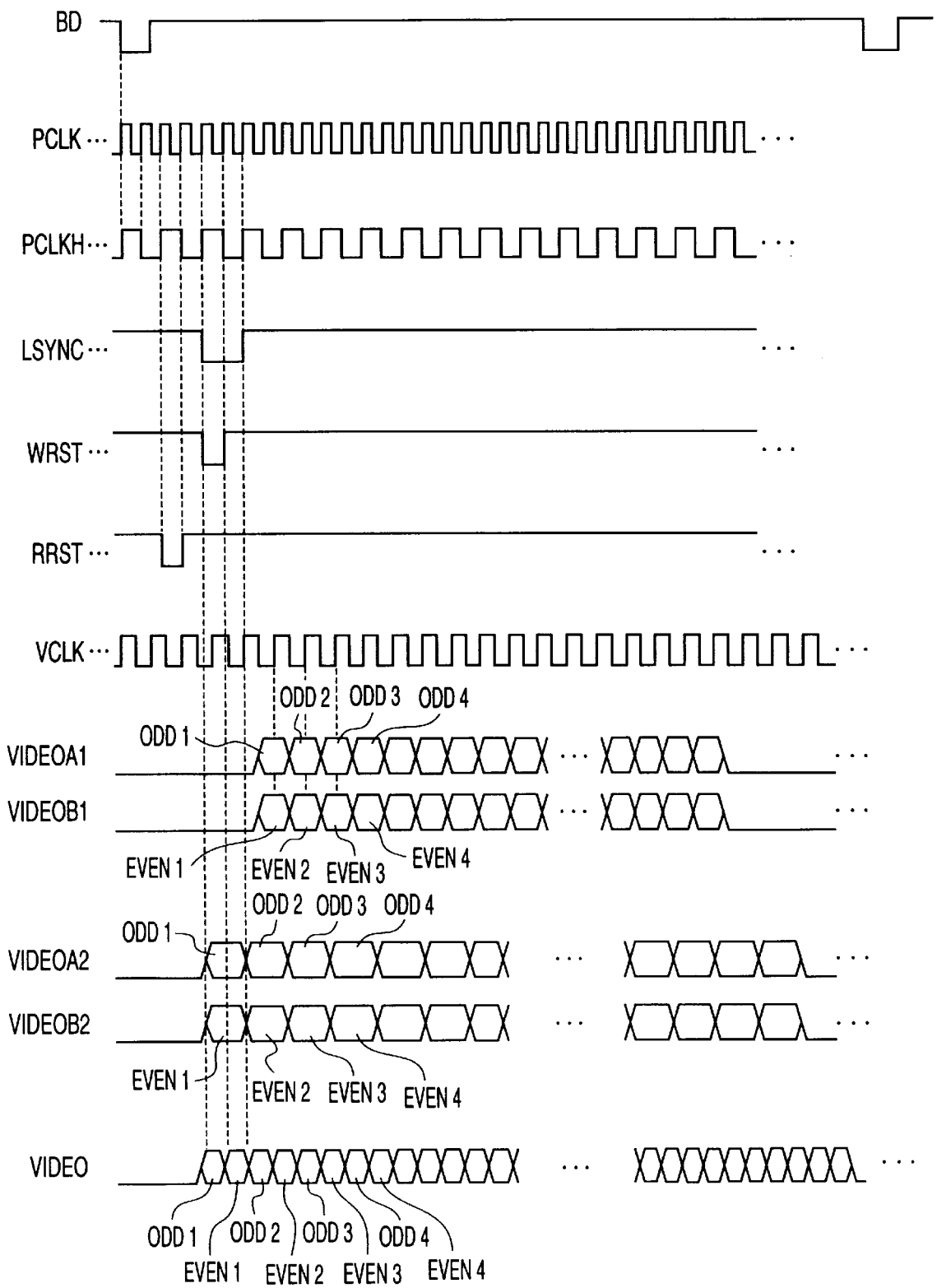
FIG. 9 is a timing chart which shows the timing of operations with respect to each of the control signals and data represented in FIG. 1.

In conjunction with FIG. 7 to FIG. 9, the description will be made of a third embodiment in accordance with the present invention. In this respect, the same reference marks are applied to the same members appearing in FIG. 1 and FIG. 19, and the description thereof will be omitted. Also, with respect to the structure and operation of the image generating system (hereinafter referred to as an engine 101), the description has been made in conjunction with FIG. 20. Therefore, the description thereof will be omitted.

Figure 7:
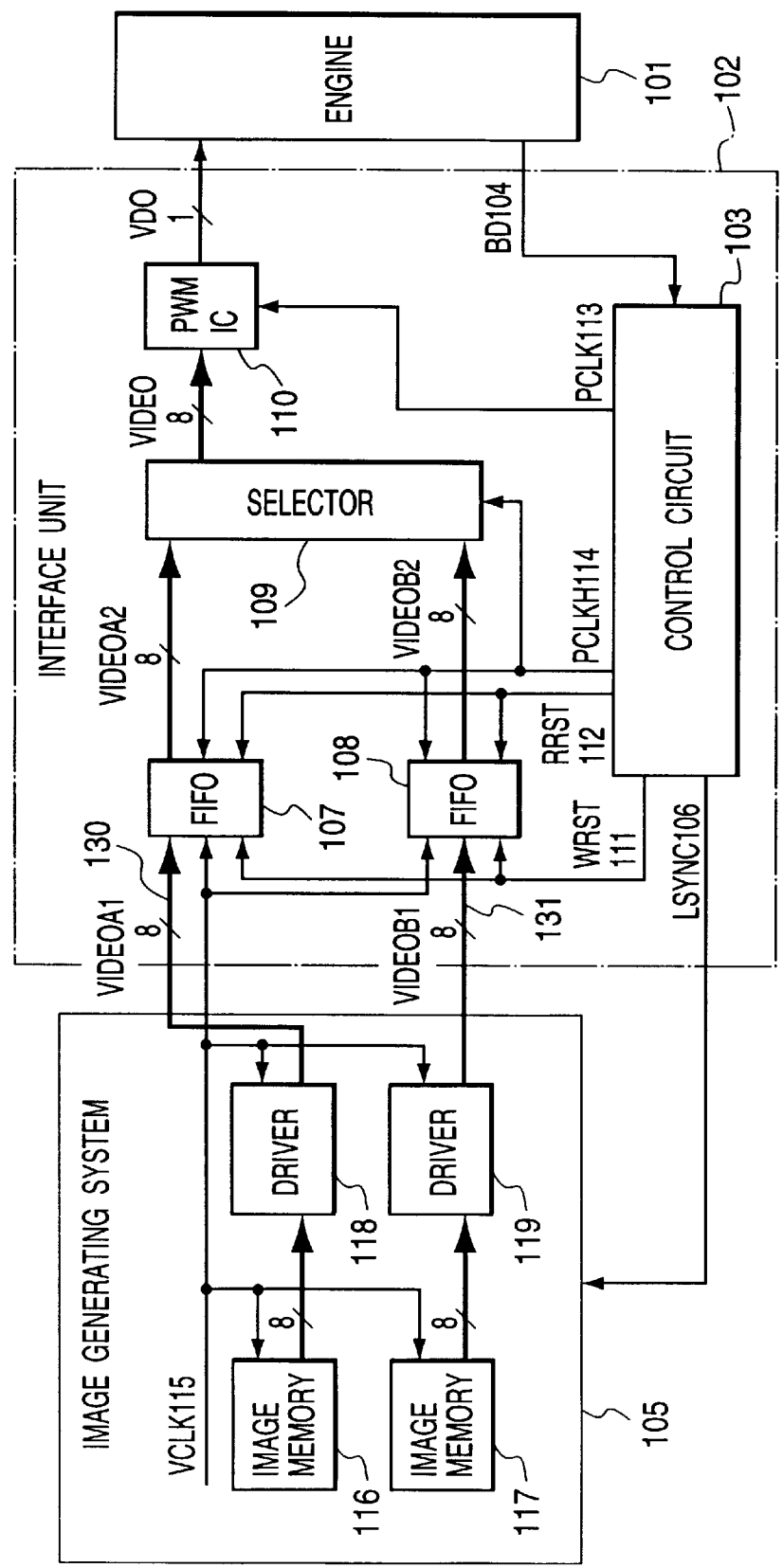
FIG. 7 is a block diagram which shows the structure of an image generating system in accordance with a third embodiment of the present invention.

As shown in FIG. 7, the interface unit 102 is provided with two FIFO memories 107 and 108, a selector 109, a PWM IC 110, and a control circuit 103. The control circuit 103 is arranged after the PWM IC 110.

Here, the control circuit 103 generates from the BD signal 104, the LSYNC signal 106; the resetting signal (write reset) 111 for the FIFOs 107 and 108; the RRST signal (read reset) 112; the clock PCLK signal 113 which is in synchronism with the BD signal to serve as the image generating signal; and the clock PCLKH signal 114 whose frequency is ½ of the frequency of the clock PCLK signal 113. Also, the LSYNC signal 106 is transmitted to the image generating system 105. The clock PCLK signal 113 is transmitted to the PWM IC 110. The clock PCLKH signal 114 is transmitted to the FIFOs 107 and 108 and the selector 109, respectively.

Also, the image generating system 105 is provided with two image memories 116 and 117, and two drivers 118 and 119 as well. This image generating system 105 is structured to be able to sweep out data per two-dot portion. In other words, as shown in FIG. 2, if the odd and even numbered data are arranged in line on a printing sheet in the main scanning direction X, the image generating system 105 is controlled to be able to sweep out the odd and even numbered image data in the main scanning direction X per tow-dot portion at a time in synchronism with the clock (VCLK).

Now, the description will be made of the operation to be carried out under the structure arranged as above. At first, the image generating system 105 reads out one line portion of the multivalued image data from the image memories 116 and 117 to the drivers 118 and 119 in synchronism with the arbitrary clock (hereinafter referred to as VCLK) 115 at the timing of the LSYNC signal 106 generated in the interface unit 102. Further, from the drivers 118 and 119, one line portion each of the multivalued image data VIDEOA1 and VIDEOB1 is written on the FIFOs memories 107 and 108 per two-dot portion in synchronism with the VCLK signal 115, respectively. Here, the image data produced by a host computer or an image reading device are transferred to the image memories 116 and 117 and stored on them, for example.

Now, for example, the image memory 116 is assigned to storing the odd number data VIDEOA1, and the image memory 117 is assigned to storing the even number data VIDEOB1. Then, from the image memory 116, the odd number data VIDEOA1 are read out and from the image memory 117, the even number data VIDEOB1 are read out in synchronism with the VCLK signal 115. In other words, the odd number data VIDEOA1 are written on the FIFO memory 107, and the even number data VIDEOB1 are written on the FIFO memory 108.

In this respect, it should be arrange to make the frequency of the VCLK signal 115 higher than the frequency that enables the one line portion of image data to be transferred within the one cycle period of the BD signal. However, since the data are transferred per two-dot portion in parallel, the frequency of the VCLK signal 115 may be ½ of the conventional frequency at which one dot portion of data is transferred (see the VCLK signal 804 in FIG. 14).

Then, the multivalued image data written on the FIFOs 107 and 108 are read out in synchronism with the PCLKH signal 114 to be transmitted to the selector 109. The selector 109 selects the FIFO memory 107 or FIFO memory 108 in synchronism with the PCLKH signal 114, thus sweeping out the multivalued image data VIDEO to the PWM IC 110. In the PWM IC 110, the multivalued image data are converted into the binary image data VDO. Then, the binary data VDO are transferred by the PCLK signal 113 to the engine 101 to generate images.

In conjunction with FIG. 9, the description will be made of the output timing of each of the control signals, the VCLK signal, and the multivalued image data VIDEO generated by the control circuit 103.

The PCLK signal 113, namely, the image generating signal, synchronizes with the fall of the BD signal 104. The PCLKH signal 407 is ½ cycle of the PCLK signal 113. The PCLKH signal 114 and PCLK signal 113 have the same phase. The LSYNC signal 106, WRST signal 111, RRST signal 112 are output from the control circuit 103 at the timing indicated in FIG. 3.

When the image generating system 105 receives the LSYNC signal 106, the multivalued image data VIDEOA1 and VIDEOB1 are read out from the drivers 118 and 119 in parallel in synchronism with the VCLK signal 115, and inputted into the FIFO memories 107 and 108 in synchronism with the VCLK signal, respectively. Then, the multivalued image data VIDEOA2 and VIDEOB2 are read out in synchronism with the PCLKH signal 114 to be inputted into the selector 109. Then, by means of the selector 109, the multivalued image data VIDEO, the odd 1, odd 2, odd 3, . . . , . . . , are output if the PCLKH 114 is at a higher level, and the even 1, even 2, even 3, . . . , . . . , are output if the PCLKH 114 is at a lower level. In this manner, the odd 1, even 1, odd 2, even 2, odd 3, even 3, . . . , . . . , are output in that order. The VIDEOA2 and VIDEOB2 are the data which are written on the FIFOs 107 and 108 during the intervals between the last BD signals. The VIDEOA2 and VIDEOB2 are read out from the FIFOs 107 and 108 during the intervals between the next BD signals.

Also, the buffers that store the binary image data may be arranged for the FIFOs 107 and 108 that store the multivalued image data. The PWM IC 110 may be a clock synchronous buffer. When the FIFOs and PWM IC are replaced with buffers, the image data from the image generating system 105 are the binary ones. Such image data are transferred to the engine 101 through the interface unit 102.

Also, in accordance with the present embodiment, the image memories 116 and 117 of the image generating system 105 have been arranged to be two, but the memories are not necessarily limited to this number. It may be N numbers, while the number of the data swept out from the image generating system 105 in synchronism with the clock may be arranged to be in N numbers. Also, the number of the FIFO memories 107 and 108 in the interface unit 102 may be arranged to be in N numbers. Then, it becomes possible to execute the same processing even by making the frequency of the VCLK signal is made to be 1/N times of the image clock PCLK signal.

As described above, the image memory domain of one image in the image generating system 105 is arranged to be in N numbers, and then, the image data are swept out from the image generating system 105 per N dot portion at a time. In this manner, the transfer speed from the image generating system 105 to the interface unit 102 can be made 1/N. As a result, even if the image clock, PCLK signal, of the engine 101 becomes faster, it is possible to make the transfer speed slower in sweeping out the data from the image generating system 105.

(Fourth Embodiment)

Now, in conjunction with FIG. 10 to FIG. 13, the description will be made of a fourth embodiment in accordance with the present invention. In this respect, the description will be omitted as to the same parts as those appearing in the first, second and third embodiments.

Figure 10:
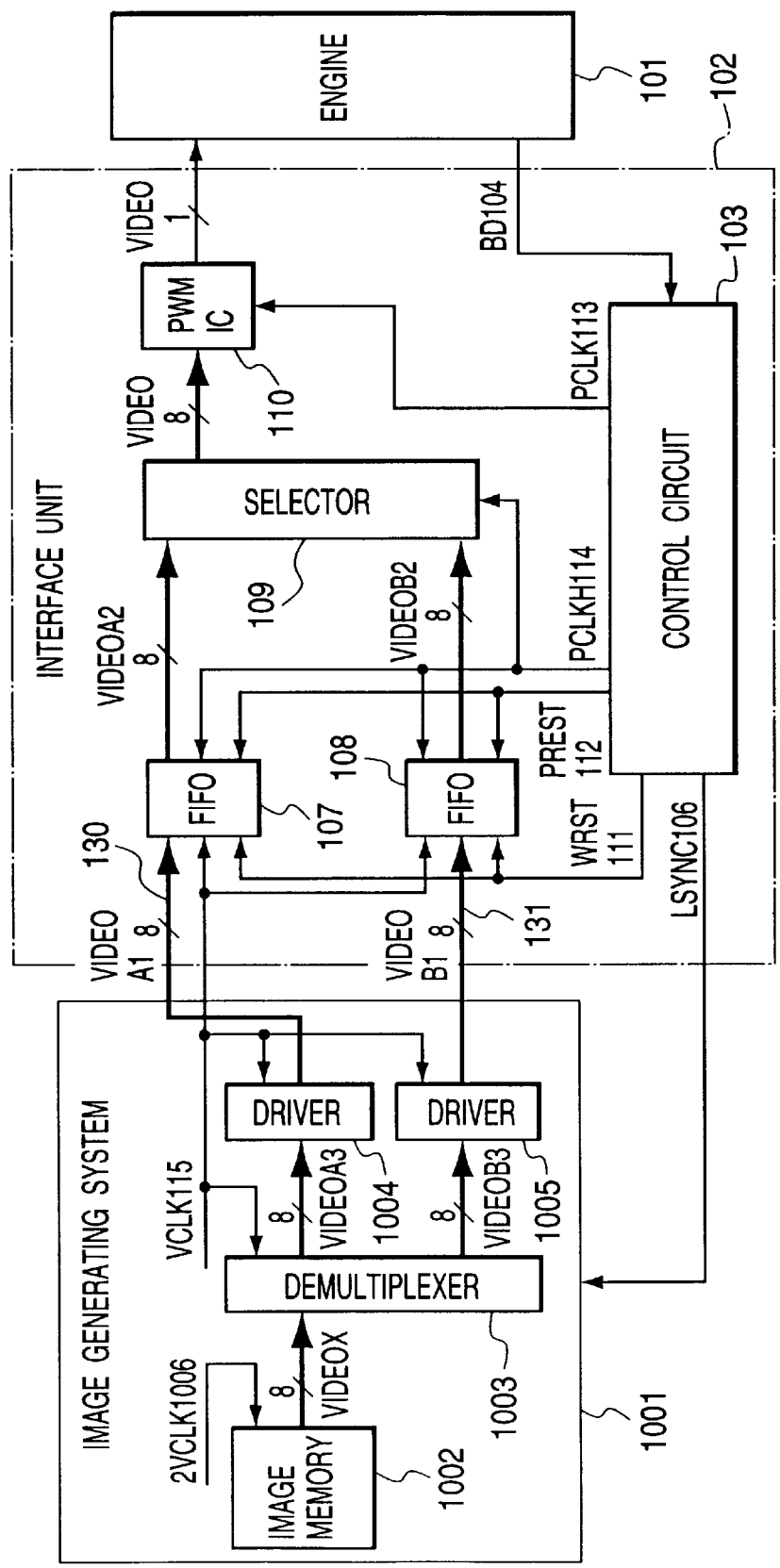
FIG. 10 is a block diagram which shows the structure of a system in according with a fourth embodiment of the present invention.

FIG. 10 is a view which shows the structure of a system in accordance with the present invention. For the image generating system 1001, there are provided one image memory 402; one demultiplexer 1003; and two drivers 1004 and 1005.

At first, in the image generating system 1001, one line portion of the multivalued image data VIDEOX is read out from the image memory 1002 to the demultiplexer 1003 in synchronism with an arbitrary clock 2VCLK signal 1006 in accordance with the timing of the LSYNC signal generated in the interface unit 102. The multivalued data VIDEOX thus read from the image memory 1002 is divided into two by the demultiplexer 1003 one after another, and after that, transferred to the drivers 1004 and 1005 in parallel in synchronism with the arbitrary clock VCLK signal. Then, the multivalued image data VIDEOX are transferred to the FIFO memories 107 and 108 in the interface unit 102 from the drivers 1004 and 1005 in parallel in synchronism with the VCLK signal 115. In this respect, the image data produced by a host computer or by an image reading device are transferred and stored on the image memory 1002, for example.

Here, for example, the odd numbered data VIDEOX are transferred from the image memory 1002 to the driver 1004, and the even numbers data VIDEOX to the driver 1005.

In this respect, the VCLK signal 115 has the frequency higher than that enables one line portion of the image data to be transferred within one cycle period of the BD signal 104. However, in accordance with the present embodiment, the image data can be transferred in parallel per two-dot portion. Therefore, the VCLK signal 115 may be approximately ½ of the conventional frequency (see the VCLK signal 804 in FIG. 14). Here, since the structure and operation of the interface unit 102 and the engine 101 are the same as those of the first embodiment, the description thereof will be omitted.

Figure 11:
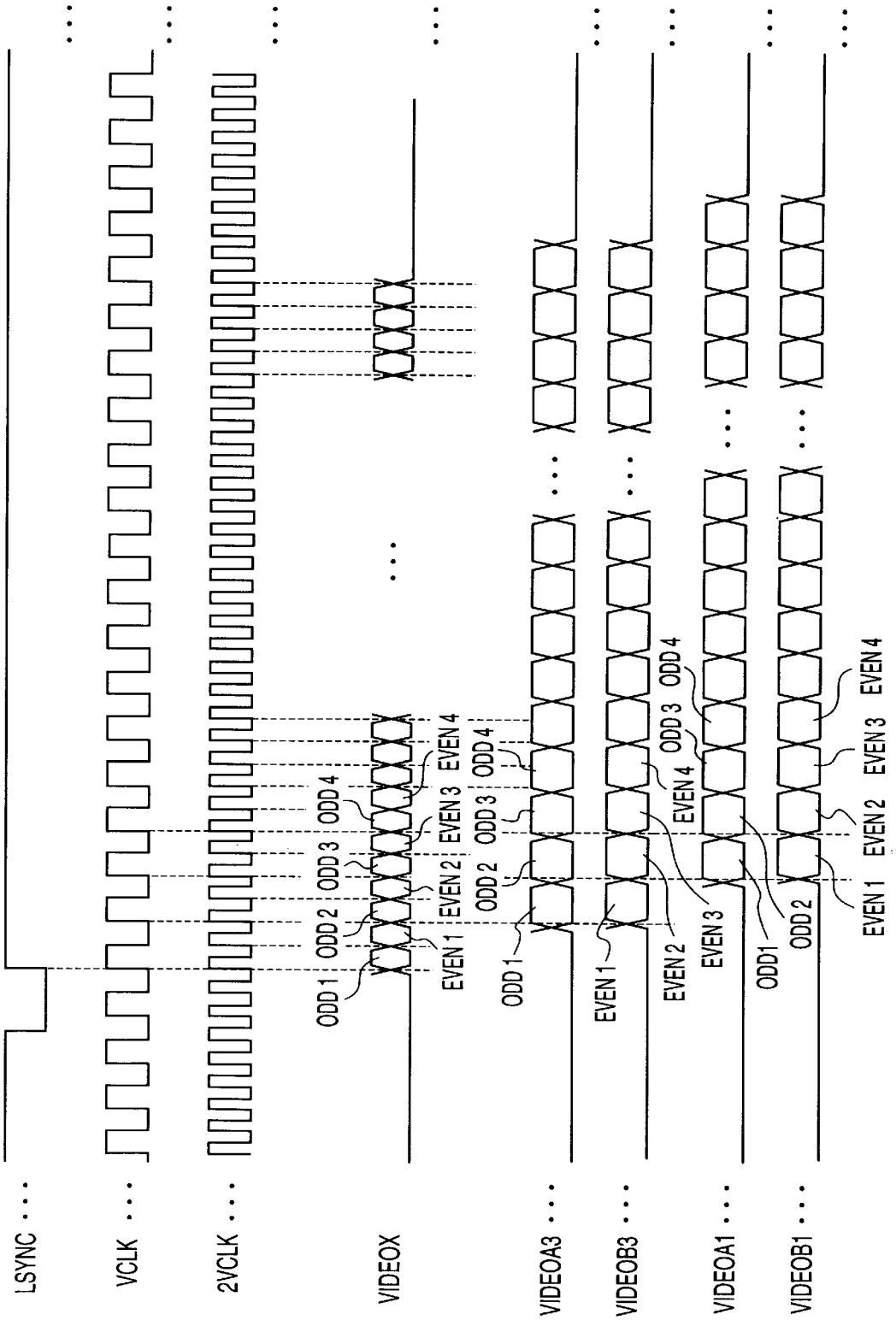
FIG. 11 is a timing chart which shows the timing of operations with respect to each of the control signals and data represented in FIG. 10.

Now, in conjunction with FIG. 11, the description will be made of the operational timing of the VCLK signal 115, 2VCLK signal 1006, and VIDEO signals in the image generating system 1001.

The 2VCLK signal 1006 is formed by a double clock (that is, ½ cycle) of the VCLK signal 115, and the 2VCLK signal 1006 has the same phase as that of the VCLK signal 115. Also, the 2VCLK signal 1006 may be arranged in the same cycle as that of the PCLK signal which is the image generating signal.

Then, when the image generating system 1001 receives the LSYNC 106, the multivalued image data VIDEOX are read out from the image memory 1002 in synchronism with the 2VCLK signal 1006. The multivalued image data VIDEOX are transferred to the drivers 1004 and 1005 in synchronism with the VCLK signal 115 through the demultiplexer 1003, and further, transferred to the interface unit 102 in synchronism with the VCLK signal 115.

Figure 12:
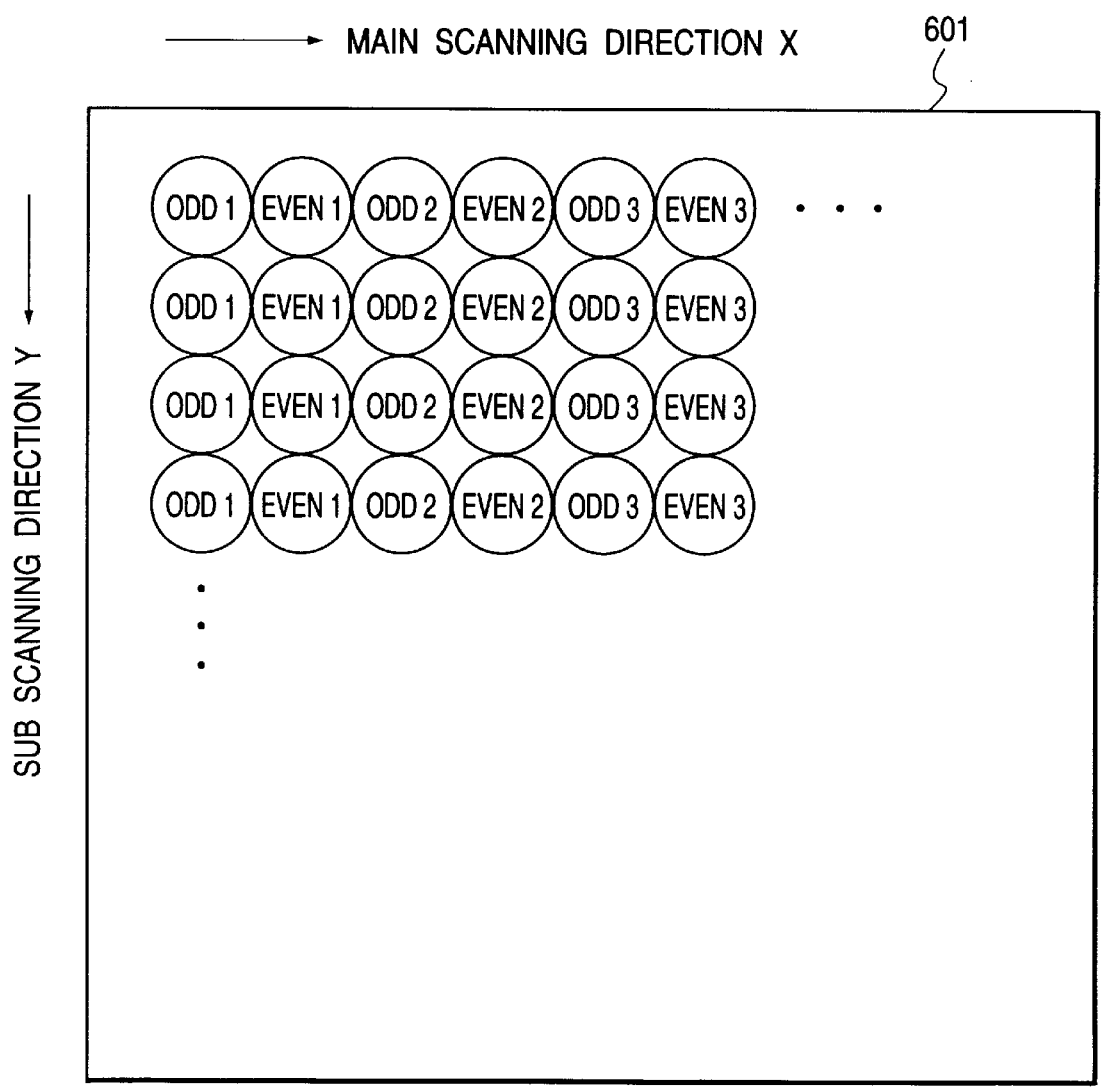
FIG. 12 is a view which illustrates the printing output to a recording sheet.

Here, for example, the VIDEOA3 is the odd numbered data, and the VIDEOB3 is the even numbered data. As shown in FIG. 12, if the odd numbers and even numbers are arranged in line on the printing sheet in the main scanning direction X, the data on (odd 1 and even 1), the data on (odd 2 and even 2), the data on (odd 3 and even 3), and ..., .. . are transferred to the demultiplexer 1003 at the same timing, respectively.

Also, the sweeping out speed from the image generating system 1001 can be made ½ if the drivers are formed in N numbers by dividing the image data in the N numbers one after another by means of the demultiplexer in the image generating system 1001.

Figure 13:
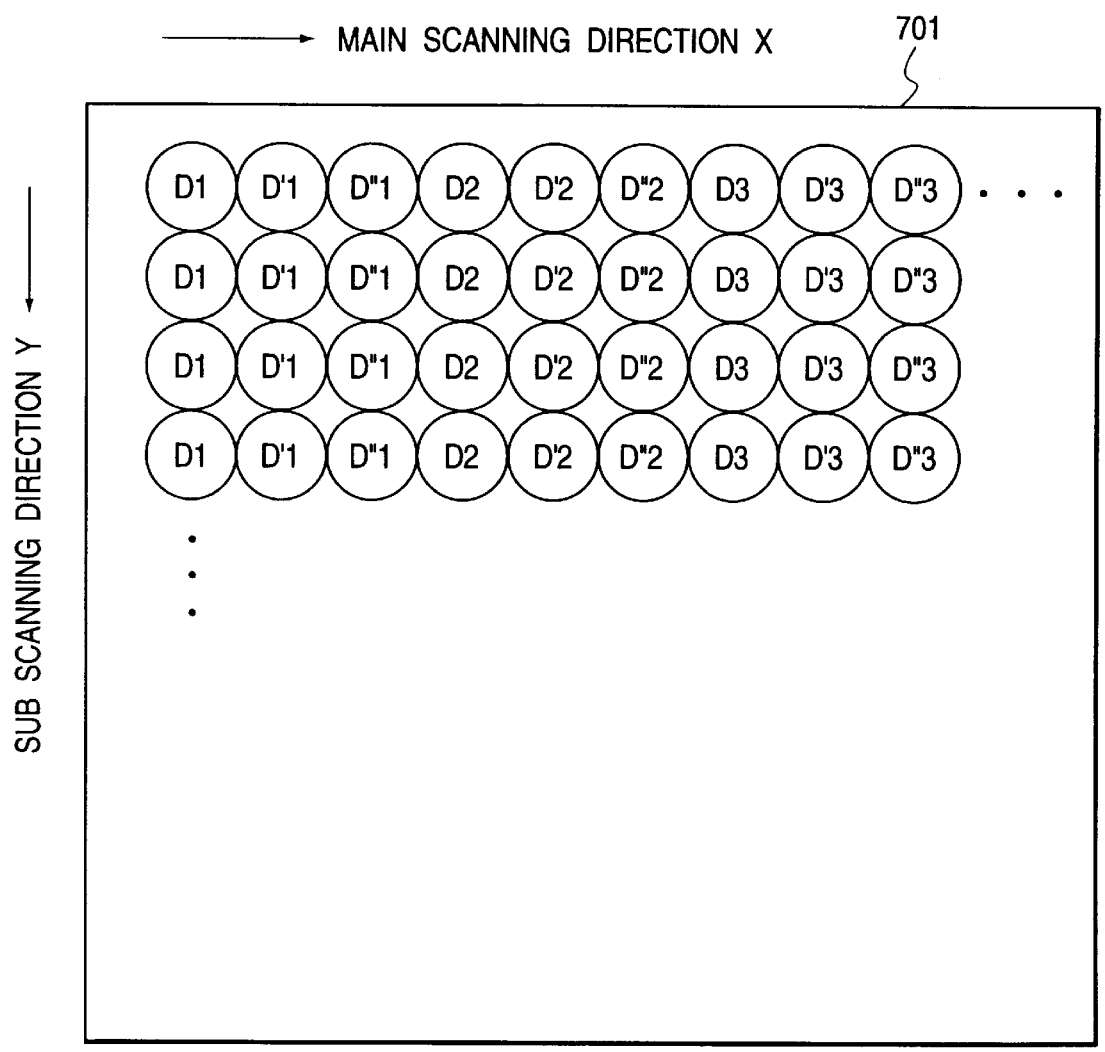
FIG. 13 is a view which illustrates the printing output to a printing sheet when the speed of data transfer from the image generating unit is one third.

Fox example, as shown in FIG. 13, if the D1, D'1, D"1, D2, D'2, D"2, D3, D'3, D"3, ..., ... are arranged in line on a printing sheet 701 in the main scanning direction X, the sweeping out speed from the image generating system 1001 can be made ⅓.

As described above, one image in one domain of the image memory in the image generating system 1001 is divided into N numbers of data by means of the demultiplexer 1003 one after another, and the image data is swept out from the image generating system per N dot portion at a time. In this manner, the transfer speed can be made 1/N for the image generating system 1001. Moreover, the system can be formed by one memory. Also, even if the image clock PCLK signal 113 of the engine 101 is made faster, it is possible to slow down the transfer speed at which the image data VIDEOA1 and VIDEOB1 are swept out.

Here, it may be possible to apply the present invention to a system structured by a plurality of equipment (such as, a host computer, an interface device, a reader, and a printer) or to apply it to a single equipment (such as a copying machine, a facsimile).

Here, of course, it is possible to achieve the objectives of the present invention in such a manner that a storage medium, which is provided with the programming codes of the software for materializing the functions of the embodiment described above, is supplied to a system or an apparatus, and that the system or the computer (CPU or MPU) of such apparatus reads out the stored programming codes for the execution thereof. In this case, the programming codes read out from the storage medium themselves materialize the functions of the embodiment described above. It is to be understood, therefore, that the storage medium that stores such programming codes constitutes the present invention.

For each of the storage media that supply the programming codes, a floppy disk, a hard disk, an optical disk, a magneto-optic disk, a CD-ROM, a CD-R, a magnetic tape, a non-volatile memory card, and a ROM can be used, among some others.

Also, not only, a computer can execute the programming codes thus read out to materialize the functions of the embodiment described above, but an OS (operating system) or the like that operates on the computer as instructed in accordance with the programming codes, thus executing the actual processing partly or totally. It is of course included in the scope of the present invention if the functions of the embodiment described above are materialized by the execution of such actual processing.

Further, the programming codes read from the storage medium are written on a memory provided for the functional extension board inserted into a computer or provided for the functional extension unit connected with a computer, and then, the CPU or the like arranged on such functional extension board or functional extension unit executes the actual processing partly or totally. It is of course included in the scope of the present invention if the functions of the embodiment described above are materialized by the execution of such actual processing.

(Fifth Embodiment)

Now, in conjunction with FIG. 14 to FIG. 17, the description will be made of a fifth embodiment in accordance with the present invention. In this respect, the description will be omitted as to the same parts as those appearing in the first, second, third, and fourth embodiments.

Figure 14:
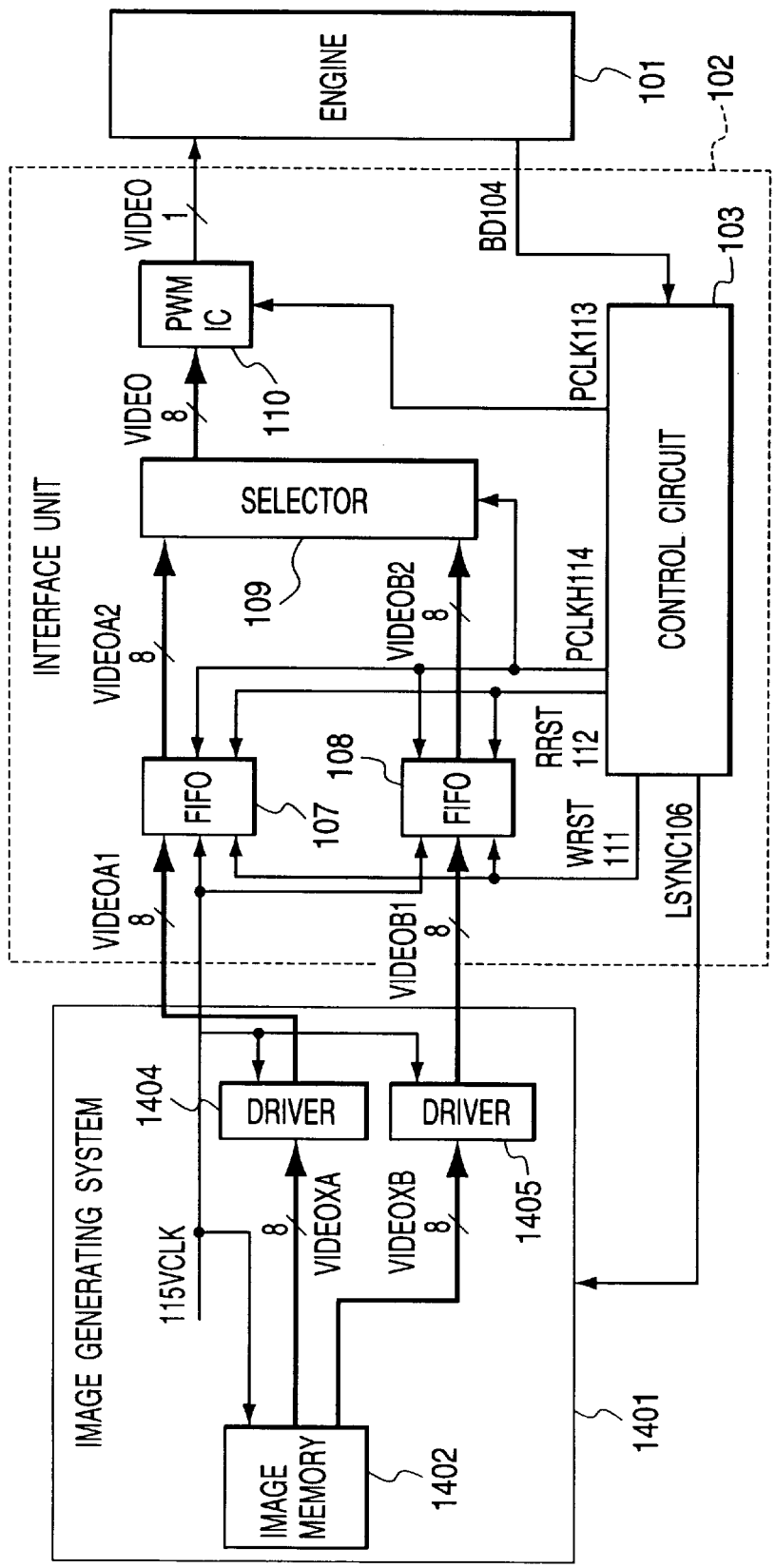
FIG. 14 is a block diagram which shows the structure of the system in accordance with the first embodiment.

FIG. 14 is a view which shows the structure of an image generating system in accordance with the present invention. For the image generating system 1401, there are provided one image memory 1402 and two drivers 1404 and 1405.

The image memory 1402 is able to transfer 16-bit data.

At first, in the image generating system 1401, one line portion of the multivalued data VIDEOXA and VIDEOXB are transferred from the image memory 1402 to the drivers 1404 and 1405 in synchronism with the VCLK 115 in accordance with the timing of the LSYNC signal 106 generated in the interface unit 102, and then, to the drivers 1404 and 1405 in parallel in synchronism with the VCLK 115. Here, the image data produced by a host computer or by an image reading device are transferred and stored on the image memory 1402, for example.

On the assumption that the higher eight bits of the sixteen bits of the image memory 1402 carry the odd numbered data VIDEOXA, and that the lower eight bits thereof carry the even numbered data VIDEOXB, the odd numbers data VIDEOXA is transferred to the driver 1404, and the even numbered data VIDEOXB to the driver 1405, for example.

In this respect, the VCLK signal has the frequency higher than that enables one line portion of the image data to be transferred within one cycle period of the BD signal. However, since the structure and operation of the interface unit 102 and the engine 101 are the same as those of the first, second, third, and fourth embodiments, the description thereof will be omitted.

Figure 15:
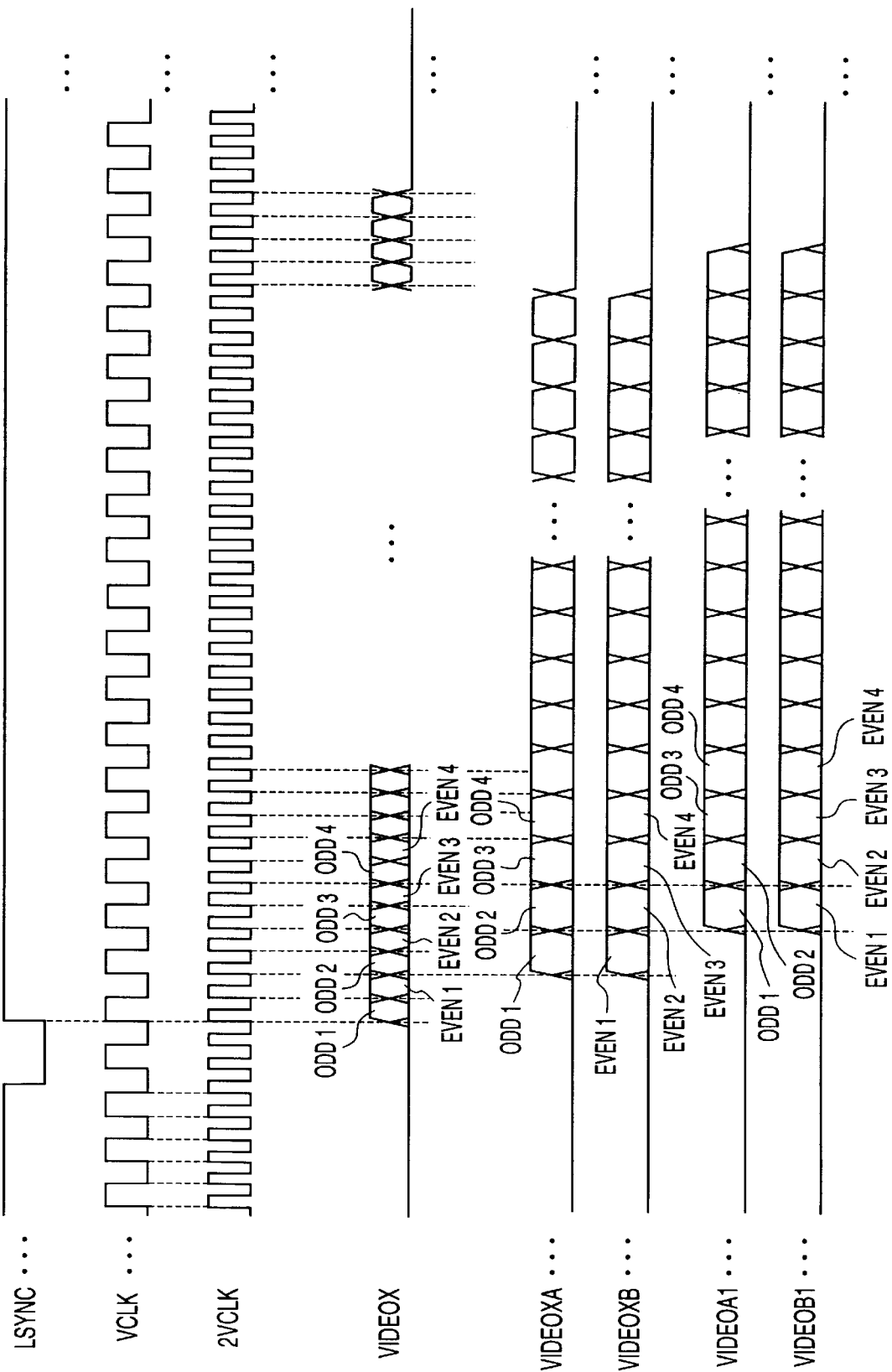
FIG. 15 is a timing chart which shows the timing of operations of each of the control signals and data represented in FIG. 14.
Figure 16:
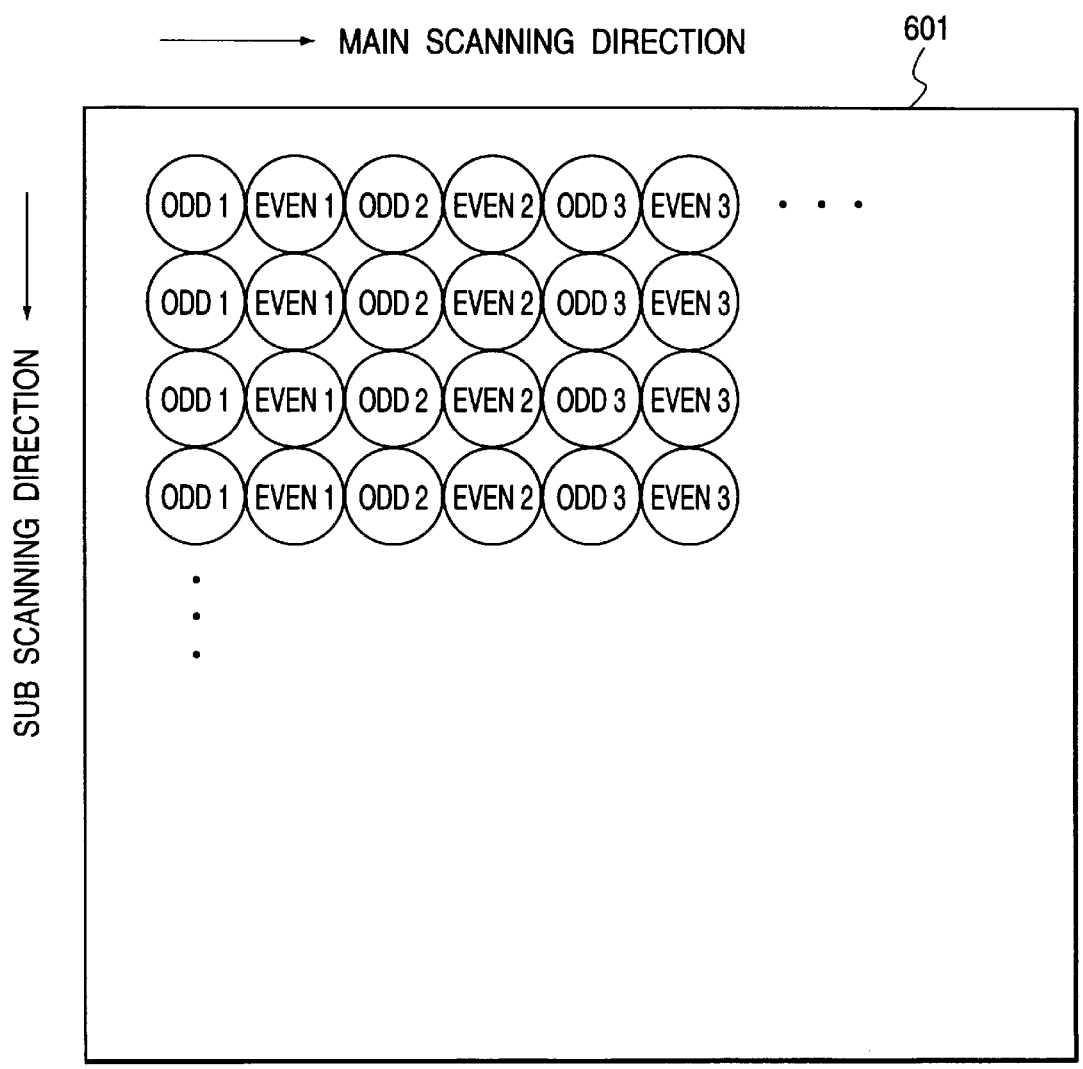
FIG. 16 is a view which illustrates the printing output to a printing sheet.

Now, FIG. 15 is a timing chart of the VCLK 115 and VIDEO signals in the image generating system 1401. When the image generating system 1401 receives the LSYNC 106, the VIDEOXA and VIDEOXB are read out and transferred to the drivers 1004 and 1005, and then, to the interface unit 102. Here, for example, the VIDEOXA is the odd numbered data, and the VIDEOXB is the even numbered data. As shown in FIG. 16, if the odd numbers and even numbers are arranged in line on the printing sheet in the main scanning direction X, the data on (odd 1 and even 1), the data on (odd 2 and even 2), the data on (odd 3 and even 3), and ..., ..

. are transferred to the drivers 1404 and 1405 at the same timing, respectively.

Figure 17:
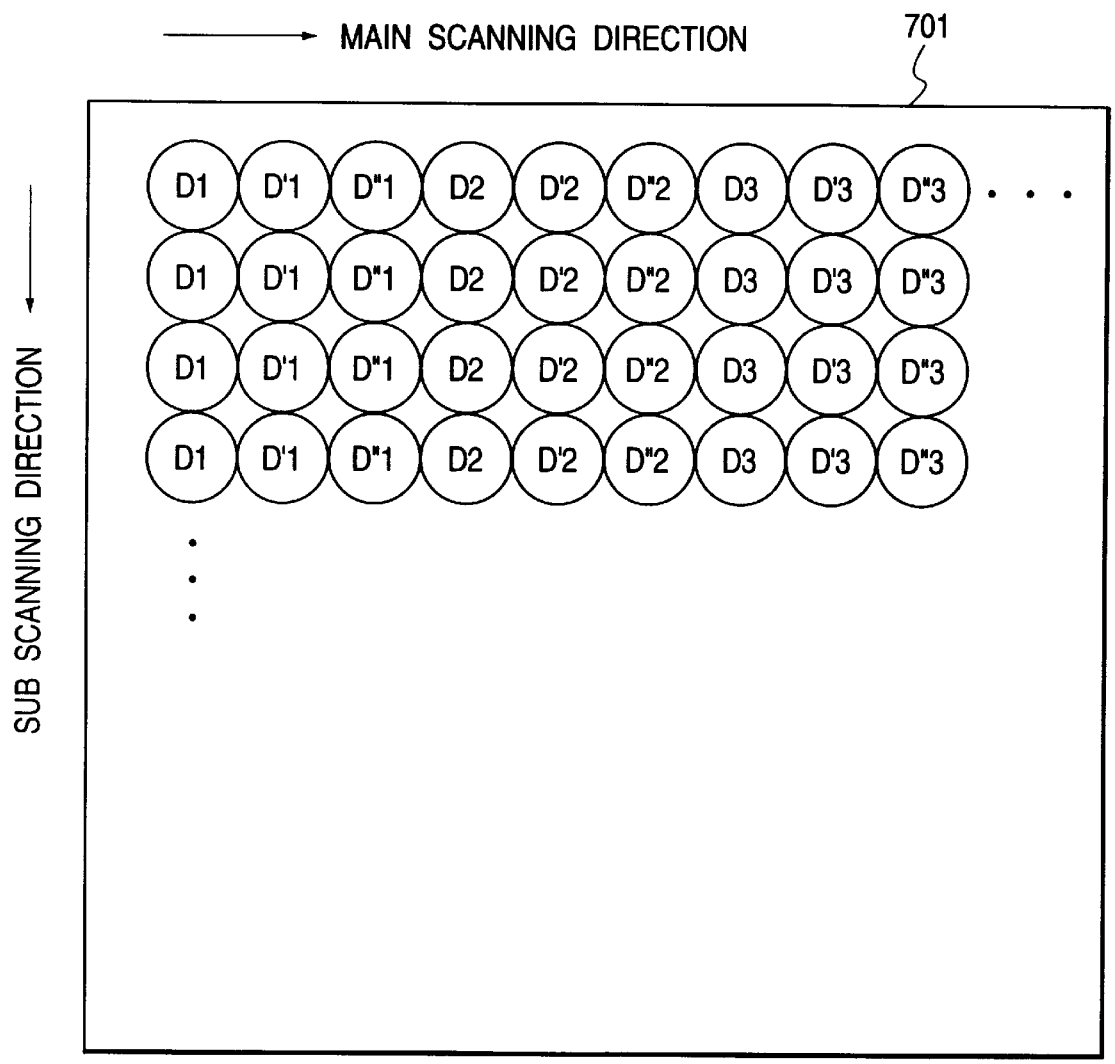
FIG. 17 is a view which illustrates the printing output to a printing sheet.

Also, the sweeping out speed from the image memory can be made at the clocking speed at which data are transferred to the interface unit if the drivers are formed in N numbers while arranging the image memory 1402 in the image generating system to be (8×N) bits. Fox example, as shown in FIG. 17, if the D1, D'1, D"1, D2, D'2, D"2, D3, D'3, D"3, . . . , . . . are arranged in line on a printing sheet 701 in the main scanning direction X, the sweeping out speed from the image memory can be made the clocking speed at which the data are transferred to the interface unit.

Here, it may be possible to apply the present invention to a system structured by a plurality of equipment (such as, a host computer, an interface device, a reader, and a printer) or to apply it to a single equipment (such as a copying machine, a facsimile).

Here, of course, it is possible to achieve the objectives of the present invention in such a manner that a storage medium, which is provided with the programming codes of the software for materializing the functions of the embodiment described above, is supplied to a system or an apparatus, and that the system or the computer (CPU or MPU) of such apparatus reads out the stored programming codes for the execution thereof.

In this case, the programming codes read out from the storage medium themselves materialize the functions of the embodiment described above. It is to be understood, therefore, that the storage medium that stores such programming codes constitutes the present invention.

For each of the storage media that supply the programming codes, a floppy disk, a hard disk, an optical disk, a magneto-optic disk, a CD-ROM, a CD-R, a magnetic tape, a non-volatile memory card, and a ROM can be used, among some others.

Also, not only, a computer can execute the programming codes thus read out to materialize the functions of the embodiment described above, but an OS (operating system) or the like that operates on the computer as instructed in accordance with the programming codes, thus executing the actual processing partly or totally. It is of course included in the scope of the present invention if the functions of the embodiment described above are materialized by the execution of such actual processing.

Further, the programming codes read from the storage medium are written on a memory provided for the functional extension board inserted into a computer or provided for the functional extension unit connected with a computer, and then, the CPU or the like arranged on such functional extension board or functional extension unit executes the actual processing partly or totally. It is of course included in the scope of the present invention if the functions of the embodiment described above are materialized by the execution of such actual processing.

(Sixth Embodiment)

Now, in conjunction with FIG. 18, the description will be made of a sixth embodiment in accordance with the present invention. In this respect, the description will be omitted as to the same parts as those appearing in the first, second, third, fourth, and sixth embodiments.

Figure 18:
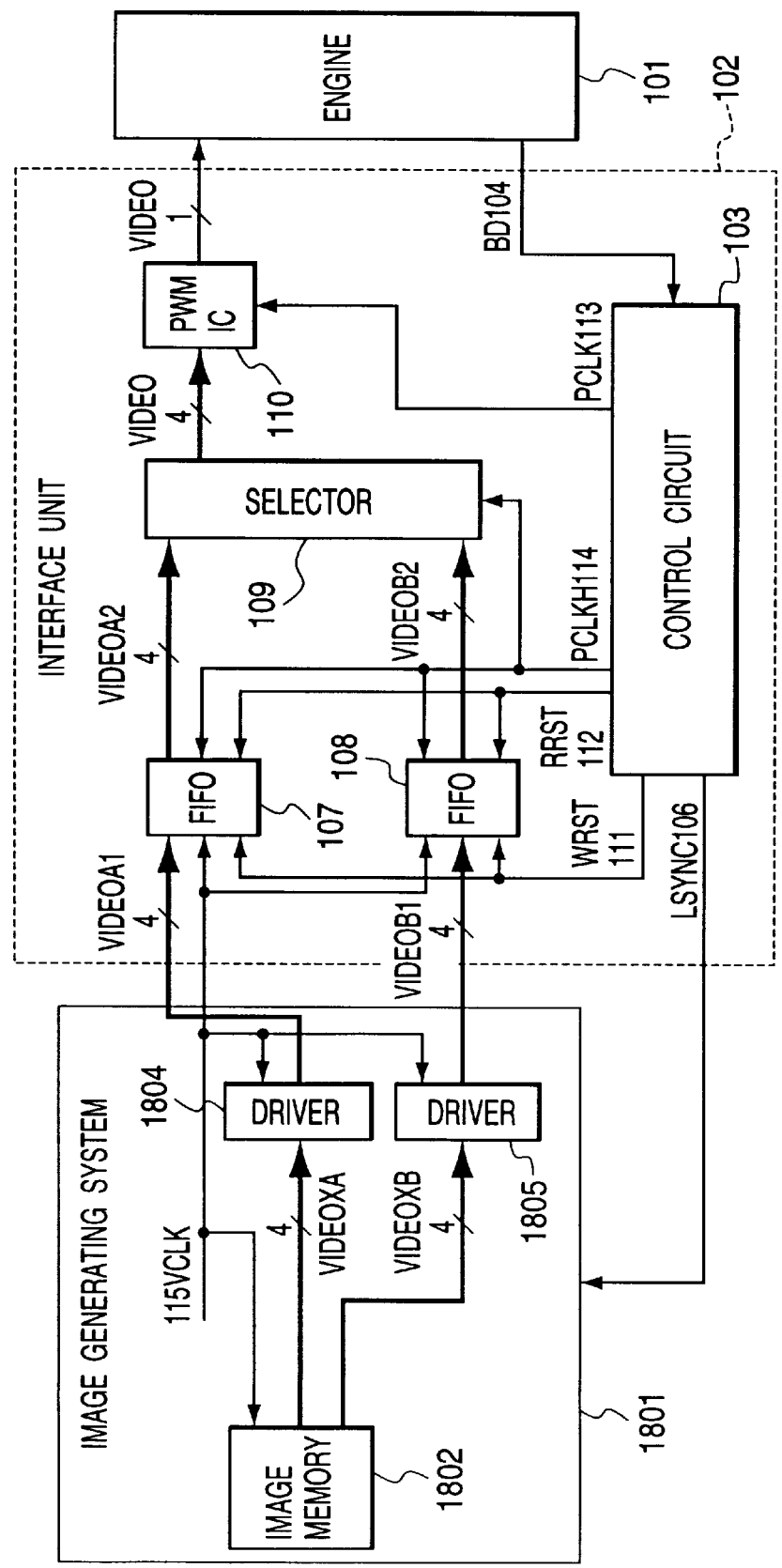
FIG. 18 is a block diagram which shows the structure of system in accordance with the second embodiment.

FIG. 18 is a view which shows the structure of an image generating system in accordance with the sixth embodiment of the present invention. For the image generating system 1801, there are provided one image memory 1802 and two drivers 1804 and 1805.

The image memory 1802 is able to transfer 8-bit data.

At first, in the image generating system 1801, one line portion of the multivalued data VIDEOXA and VIDEOXB are transferred from the image memory 1802 to the drivers 1804 and 1805 in synchronism with the VCLK 115 in accordance with the timing of the LSYNC signal 106 generated in the interface unit 102, and then, to the FIFO memories 107 and 108 in the VIDEO interface unit 102 from the drivers 1404 and 1405 in parallel in synchronism with the VCLK 115. Here, the image data produced by a host computer or by an image reading device are transferred and stored on the image memory 1802, for example.

On the assumption that the higher four bits of the eight bits of the image memory 1802 carry the odd numbered data VIDEOXA, and that the lower four bits thereof carry the even numbered data VIDEOXB, the odd numbers data VIDEOXA is transferred to the driver 1804, and the even numbered data VIDEOXB to the driver 1805, for example.

In this respect, the VCLK signal has the frequency higher than that enables one line portion of the image data to be transferred within one cycle period of the BD signal. However, since the structure and operation of the interface unit 102 and the engine 101 are the same as those of the first, second, third, fourth, and fifth embodiments, the description thereof will be omitted.

Also, the sweeping out speed from the image memory can be made at the clocking speed at which data are transferred to the interface unit if the drivers are formed in N numbers while arranging the image memory 1802 in the image generating system to be (4×N) bits, and also, the FIFOs in the interface unit are arranged to be in N numbers and the frequency of the VCLK is arranged to be 1/N times. In this manner, it becomes possible to transfer the data from the image memory to the interface unit per N-dot portion at a time.

The four-bit arrangement brings about the reduced gradation numbers per dot. However, since there is no need for the higher transfer clock for the data transfer from the image memory 1802 to the drivers 1804 and 1805, the method described above presents an effective means.

Here, it may be possible to apply the present invention to a system structured by a plurality of equipment (such as, a host computer, an interface device, a reader, and a printer) or to apply it to a single equipment (such as a copying machine, a facsimile).

Here, of course, it is possible to achieve the objectives of the present invention in such a manner that a storage medium, which is provided with the programming codes of the software for materializing the functions of the embodiment described above, is supplied to a system or an apparatus, and that the system or the computer (CPU or MPU) of such apparatus reads out the stored programming codes for the execution thereof. In this case, the programming codes read out from the storage medium themselves materialize the functions of the embodiment described above. It is to be understood, therefore, that the storage medium that stores such programming codes constitutes the present invention.

For each of the storage media that supply the programming codes, a floppy disk, a hard disk, an optical disk, a magneto-optic disk, a CD-ROM, a CD-R, a magnetic tape, a non-volatile memory card, and a ROM can be used, among some others.

Also, not only, a computer can execute the programming codes thus read out to materialize the functions of the embodiment described above, but an OS (operating system) or the like that operates on the computer as instructed in accordance with the programming codes, thus executing the actual processing partly or totally. It is of course included in the scope of the present invention if the functions of the embodiment described above are materialized by the execution of such actual processing.

Further, the programming codes read from the storage medium are written on a memory provided for the functional extension board inserted into a computer or provided for the functional extension unit connected with a computer, and then, the CPU or the like arranged on such functional extension board or functional extension unit executes the actual processing partly or totally. It is of course included in the scope of the present invention if the functions of the embodiment described above are materialized by the execution of such actual processing.

As described above, in accordance with the present invention, the image memory domain of one image in the image generating unit is divided into N domains. Then, it is arranged to transfer the image data from the image generating unit to the interface unit per N-dot portion in parallel at a time. Thus, the speed of data transfer from the image generating unit to the interface unit can be made 1/N. In this manner, even if the image clock in the image generating unit is made faster, it is possible to slow down the transfer speed of the image data that should be sent out from the image generating unit, hence realizing a higher processing in the image generating unit.

Also, in accordance with the present invention, it is arranged to provide one image memory in the image generating unit. Then, by means for dividing data, one image is divided into N numbers of data one after another. The image data are sent out from the image generating unit per N-dot portion in parallel at a time. Therefore, at the same time that the transfer speed of the image generating unit can be made 1/N, the image storage can be formed by one memory. In this way, it is possible to make the structure of the image generating unit simpler.

Also, in accordance with the present invention, if the bit number of the image memory is arranged to be (8×N) bits, the sweeping out speed from the image memory can be the clocking speed of transfer to the interface unit.

Also, in accordance with the present invention, if the bit numbers of the image memory is arranged to be (4×N) bits without increasing the bit numbers of the image memory, there is no need for making the clocking faster for transfer from the image memory to the driver, although the gradation numbers are reduced per bit.

What is claimed is:

1. An image generating system having an interface unit between an image generating device and an image formation device, said image generating device being provided with transfer means for transferring a plurality of pieces of N-dot data in parallel to said interface unit in synchronism with a transfer clocking from said image generating device, and said interface unit comprising:

first conversion means for converting the plurality of pieces of N-dot data transferred in parallel from said image generating device to a single N-dot data;

second conversion means for converting the single N-dot data converted by said first conversion means to one-dot serial data; and output means for outputting the one-dot serial data converted by said second conversion means to said image formation device in synchronism with an image clock signal from said image formation device.

2. An image generating system according to claim 1, wherein said sending out means sends out N-dot data in the main scanning direction per one-line portion in parallel in synchronism with a specific transfer clocking.

3. An image generating system according to claim 1, wherein said conversion means is provided with N numbers of buffers or line memories to write in said N-dot data in synchronism with the transfer clocking, and to read out them in synchronism with 1/N clock of said image formation signal, and then, to select one of the N numbers of read-out data for the conversion of one-dot serial data.

4. An image generating system according to claim 1, wherein said clock of the image formation signal and said clock of the interface unit have the same phase.

5. An image generating system according to claim 1, further comprising:

PWM conversion means for executing PWM conversion of one-dot multivalued data into binary data.

6. A method of controlling an image generating system having an interface unit between an image generating device and an image formation device, comprising the following steps of:

inputting a plurality of pieces of N-dot data in parallel from said image generating device in synchronism with a transfer clocking;

converting the plurality of pieces of N-dot data input in parallel to a single N-dot data;

converting the single N-dot data to one-dot serial data; and outputting the converted one-dot serial data to said image information device in synchronism with an image clock signal from said image formation device.

7. An image processing system for generating images in accordance with image information to be generated in an image generating unit, comprising:

N image memories for separately storing one image divided into N images;

transferring out control means for controlling the transferring out of image data for said N image memories per each of a plurality of pieces of N-dot portions in parallel in synchronism with a transfer clocking;

N memories for storing each of the plurality of pieces of the N-dot portions transferred out in parallel by said transferring out means;

first conversion means for converting the plurality of pieces of N-dot portions transferred in parallel to said N memories to a single N-dot data;

second conversion means for converting the single N-dot data converted by said first conversion means to one-dot serial data; and output means for outputting the one-dot serial data converted by said second conversion means to an image formation device in synchronism with an image clock signal from said image formation device.

8. An image processing system according to claim 7, wherein said given transfer clocking generated by said first sending out control means synchronizes with the clock having 1/N frequency of said image clock signal generated by said second sending out control means.

9. An image processing system according to claim 7 or claim 8, wherein said first sending out control means sends out in parallel one-line portion of the N-dot image data in the main scanning direction in synchronism with said given transfer clocking.

10. An image processing system for generating images in accordance with image information generated in an image generating unit, comprising:

one image memory for storing one image;

data dividing means for dividing one image transferred out one after another from said image memory into N images;

first transferring out control means for controlling the transferring out of the N-images from said data dividing means per each of a plurality of pieces of N-dot portions in parallel at a time in synchronism with a given transfer clocking;

N memories for storing separately the plurality of pieces of N-dot portions transferred out in parallel by said first transferring out control means;

first conversion means for converting the plurality of pieces of N-dot portions transferred in parallel to said N memories to a single N-dot data;

second conversion means for converting the single N-dot data converted by said first conversion means to one-dot serial data; and output means for outputting the one-dot serial data converted by said second conversion means to an image formation device in synchronism with an image clock signal from said image formation device.

11. An image processing system according to claim 10, wherein the reading out clock of said image memory synchronizes with said image clock generated by said second sending out control means, and said specific transfer clocking by said first sending out control means synchronizes with the clock having the 1/N frequency of said image formation signal generated by said second sending out control means.

12. An image processing system according to claim 10 or claim 11 wherein said first sending out control means sends out the N-dot image data in the main scanning direction per one-line portion in parallel in synchronism with said specific transfer clocking.

13. An image generating device for generating image information, comprising:

N image memories for separately storing one image divided into N images; and transferring out control means for controlling a transferring out of image data from said N image memories per each of a plurality of pieces of N-dot portions in parallel in synchronism with a transfer clocking;

first conversion means for converting the plurality of pieces of N-dot portions of image data transferred in parallel from said N image memories to a single N-dot data;

second conversion means for converting the single N-dot data converted by said first conversion means to one-dot serial data; and output means for outputting the one-dot serial data converted by said second conversion means to an image formation device in synchronism with an image clock signal from said image formation device.

14. An image generating device according to claim 13, wherein said specific transfer clocking of said sending out control means has the 1/N frequency of an image clock.

15. An image generating device according to claim 13 or claim 14, wherein said sending out control means sends out N-dot image data in the main scanning direction per one-line portion in parallel in synchronism with said specific transfer clocking.

16. An image generating device for generating image information, comprising:

one image memory for storing one image;

data dividing means for dividing one image transferred out one after another from said image memory into N images;

transferring out control means for controlling a transferring out of image data from said data dividing means per each of a plurality of pieces of N-dot portions in parallel at a time in synchronism with a transfer clocking;

first conversion means for converting the plurality of pieces of N-dot portions transferred in parallel from said image generating device to a single N-dot data;

second conversion means for converting the single N-dot data converted by said first conversion means to one-dot serial data; and output means for outputting the one-dot serial data converted by said second conversion means to an image formation device in synchronism with an image clock signal from said image formation device.

17. An image generating device according to claim 16, wherein the reading out clock of said image memory has the same frequency of said image clock signal, and the said specific transfer clocking of said sending out control means has the 1/N frequency of said image clock signal.

18. An image generating device according to claim 16 or claim 17, wherein said sending out control means sends out the N-dot image data in the main scanning direction per one-line portion in parallel in synchronism with the specific transfer clocking.

19. An image processing device comprising:

first output means for outputting in parallel a plurality of pieces of N-dot image data having plural adjacent-dot portions; and first conversion means for converting the plurality of pieces of N-dot image data output in parallel from said first output means to a single N-dot data;

second conversion means for converting the single N-dot image data converted by said first conversion means to one-dot serial data; and second output means for outputting the one-dot serial data converted by said second conversion means to an image formation device in synchronism with an image clock signal from said image formation device.

20. An image processing device according to claim 19, wherein said output means reads out said image data of the plural adjacent portions in parallel from a readable storage means.

21. An image processing device according to claim 19, further comprising:

a plurality of holding means for holding individually the image data of plural dot portions being output in parallel by said output means.

22. An image processing device according to claim 21, further comprising:

selection means for selectively outputting the image data of plural dot portions held in said plural holding means.

23. An image processing device according to claim 21, wherein said holding means are FIFO memories.

24. An image processing system for generating images in accordance with image information generated in an image generating unit, comprising:

a memory adapted for reading out a plurality of pieces of N-dot image data;

transferring out control means for controlling the transferring out the plurality of pieces of N-dot image data from said one image memory in parallel in synchronism with a transfer clocking;

N memories for storing separately the plurality of pieces of N-dot image data transferred out by said transferring out control means;

first conversion means for converting the plurality of pieces of N-dot image data transferred in parallel for storage in said N memories to a single N-dot data;

second conversion means for converting the single N-dot data converted by said first conversion means to one-dot serial data; and output means for outputting the one-dot serial data converted by said second conversion means to an image formation device in synchronism with an image clock signal from said image formation device.

25. An image processing system according to claim 24, wherein said image memory is provided with (8×N) bits so as to be capable of sending out per N-dot portion the eight-bit data having the depth of 256 gradations for one dot.

26. An image processing system according to claim 24 or claim 25, wherein said specific transfer clocking of said first sending out control means is the same as the frequency of said image clock signal generated by said second sending out control means.

27. An image processing system according to claim 24 or claim 25, wherein said first sending out control means sends out the N-dot image data in the main scanning direction per one-line portion in parallel in synchronism with said specific transfer clocking.

28. An image processing system according to claim 24, wherein said image memory is provided with (4×N) bits so as to be capable of sending out per N-dot portion the four-bit data having the depth of sixteen gradations for one dot.

29. An image generating device for generating image information, comprising:

an image memory adapted for transferring out a plurality of pieces of N-dot image data;

transferring out control means for controlling the transferring out of the plurality of pieces of N-dot image data from said one image memory in parallel in synchronism with a transfer clocking;

first conversion means for converting the plurality of pieces of N-dot data transferred in parallel from said image memory to a single N-dot data;

second conversion means for converting the single N-dot data converted by said first conversion means to one-dot serial data; and output means for outputting the one-dot serial data converted by said second conversion means to an image formation device in synchronism with an image clock signal from said image formation device.

30. An image generating device according to claim 29, wherein said image memory is provided with (8×N) bits so as to be capable of sending out per N-dot portion the eight-bit data having the depth of 256 gradations for one dot.

31. An image generating device according to claim 29, wherein said specific transfer clocking of said sending out control means is the same as the frequency of said image clock signal.

32. An image generating device according to claim 29, wherein said sending out control means sends out the N-dot image data in the main scanning direction per one-line portion in parallel in synchronism with said specific transfer clocking.

33. An image generating device according to claim 29, wherein said image memory is provided with (4×N) bits so as to be capable of sending out per N-dot portion the four-bit data having the depth of sixteen gradations for one dot.

* * * * *

UNITED STATES PATENT AND TRADEMARK OFFICE
CERTIFICATE OF CORRECTION

PATENT NO.    : 6,191,865 B1
DATED         : February 20, 2001
INVENTOR(S)   : Masayoshi Takahashi It is certified that error appears in the above-identified patent and that said Letters Patent is hereby corrected as shown below:

Column 1,
Line 23, "of" should read -- or --.

Column 2,
Line 20, "VCL k" should read -- VCLK --.

Column 4,
Line 42, "synchronizes" should read -- synchronize --.

Column 5,
Line 58, "synchronizes" should read -- synchronize --.

Column 9,
Line 65, "form" should read -- from --.

Column 13,
Line 37, "butter" should read -- buffer --.

Column 15,
Line 17, "arrange" should read -- arranged --.

Column 17,
Line 32, "Fox" should read -- For --.

Signed and Sealed this

Twenty-ninth Day of October, 2002

*Attest:*

*Attesting Officer*

JAMES E. ROGAN
*Director of the United States Patent and Trademark Office*